United States Patent
Carøe Tjørnelund et al.

(10) Patent No.: US 10,674,740 B2
(45) Date of Patent: Jun. 9, 2020

(54) SLICEABLE DAIRY PRODUCT WITH EXTENDED SHELF LIFE

(71) Applicant: Arla Foods AMBA, Viby J (DK)

(72) Inventors: Christina Carøe Tjørnelund, Hinnerup (DK); Klaus Juhl Jensen, Ølsted (DK); Mads Friis Østergaard-Clausen, Odder (DK)

(73) Assignee: Arla Foods AMBA, Viby J (DK)

( * ) Notice: Subject to any disclaimer, the term of this patent is extended or adjusted under 35 U.S.C. 154(b) by 509 days.

(21) Appl. No.: 14/899,714

(22) PCT Filed: Jul. 3, 2014

(86) PCT No.: PCT/EP2014/064256
§ 371 (c)(1),
(2) Date: Dec. 18, 2015

(87) PCT Pub. No.: WO2015/001057
PCT Pub. Date: Jan. 8, 2015

(65) Prior Publication Data
US 2016/0135473 A1    May 19, 2016

(30) Foreign Application Priority Data

Jul. 3, 2013 (EP) ..................................... 13174847

(51) Int. Cl.
*A23C 9/15* (2006.01)
*A23C 9/18* (2006.01)
(52) U.S. Cl.
CPC .......... *A23C 9/1512* (2013.01); *A23C 9/1504* (2013.01); *A23C 9/18* (2013.01)
(58) Field of Classification Search
CPC ............................... A23C 9/1512; A23C 9/18
USPC ....................................................... 426/582
See application file for complete search history.

(56) References Cited

U.S. PATENT DOCUMENTS

| | | | | |
|---|---|---|---|---|
| 4,560,560 A | * | 12/1985 | Narimatsu | A23C 19/055 426/38 |
| 5,932,274 A | * | 8/1999 | Scharfmann | A23C 19/052 426/36 |
| 6,406,736 B1 | | 6/2002 | Han | |
| 7,611,742 B2 | * | 11/2009 | Calvert, Jr. | A23C 9/123 426/519 |
| 2002/0146500 A1 | | 10/2002 | Smith | |
| 2007/0065560 A1 | | 3/2007 | Lee et al. | |
| 2008/0226767 A1 | | 9/2008 | Barbano | |
| 2009/0169690 A1 | | 7/2009 | Ma et al. | |
| 2011/0217411 A1 | * | 9/2011 | Van Der Beek | A61K 31/201 426/2 |

FOREIGN PATENT DOCUMENTS

| | | |
|---|---|---|
| CN | 1520260 A | 8/2004 |
| CN | 1602155 A | 3/2005 |
| EP | 0 283 101 A1 | 9/1988 |
| EP | 0 402 555 A1 | 12/1990 |
| EP | 0 484 728 A1 | 5/1992 |
| EP | 0 818 149 A2 | 1/1998 |
| GB | 366421 | 2/1932 |
| GB | 1380822 | 1/1975 |
| JP | 05-76280 A | 3/1993 |
| JP | 2514387 B2 | 7/1996 |
| JP | 09-238614 | 9/1997 |
| JP | 09-299025 | 11/1997 |
| JP | 10-234297 | 9/1998 |
| JP | 2006-61035 | 3/2006 |
| JP | 2009-159947 A | 7/2009 |
| WO | WO 98/08396 A1 | 3/1998 |
| WO | WO 03/000062 A2 | 1/2003 |
| WO | WO 03/051130 A2 | 6/2003 |
| WO | WO 2008/020568 A1 | 2/2008 |

OTHER PUBLICATIONS

Balatoni, M. et al., "Foamed frozen milk prods. from creamed curds—with seasoning and aroma added" Nov. 28, 1984—Abstract—XP-00205378.
International Search Report for PCT/EP2014/064256 dated Sep. 30, 2014.
El-Sheikh, Mohamed et al., "Ricotta Cheese from Whey Protein Concentrate" Journal of American Science, 2010, pp. 321-325, vol. 6, No. 8.

* cited by examiner

*Primary Examiner* — Jeffrey P Mornhinweg
(74) *Attorney, Agent, or Firm* — Knobbe Martens Olson & Bear, LLP

(57) ABSTRACT

The present invention relates to methods of making sliceable dairy product comprising milk and supplemental whey protein, an edible acid, and sodium chloride and/or sodium hydroxide, and the products obtainable by said methods.

27 Claims, 10 Drawing Sheets

SLICEABLE DAIRY PRODUCT WITH EXTENDED SHELF LIFE

CROSS REFERENCE TO RELATED APPLICATIONS

This application is a U.S. National Phase Application of PCT International Application Number PCT/EP2014/064256, filed on Jul. 3, 2014, designating the United States of America and published in the English language, which is an International Application of and claims the benefit of priority to European Patent Application No. 13174847.7, filed on Jul. 3, 2013. The disclosures of the above-referenced applications are hereby expressly incorporated by reference in their entireties.

FIELD OF THE INVENTION

The present invention relates to methods of making sliceable dairy product, and the products obtainable by said methods.

BACKGROUND OF THE INVENTION

Sliceable dairy products such as brick cheeses produced in the conventional manner, are often first prepared and then packaged after having been shaped to their final form. This is a complex method from a process viewpoint, and moreover exposes the product to risk of contamination. The contamination can lead to shorter shelf-life and earlier spoilage of the product. Improvements leading to simpler and more efficient production processes are sought after. Further, longer shelf-life is desired because distribution is simpler and more efficient if it does not have to rely on cold chains and/or having to reach the consumer rapidly.

Hence, an improved method of preparing sliceable dairy products, particularly where the products have extended shelf life, would be advantageous.

Furthermore, it is desirable to provide products with "clean label", i.e. having a minimum of additives.

Tofu is a staple ingredient in the diet in many countries, and it would be desirable to produce a milk-based product with the same appeal to these consumers. Furthermore, milk may be considered to have a higher nutritional value as it contains more essential amino acids than tofu.

SUMMARY OF THE INVENTION

Thus, the present invention provides an improved method of producing a sliceable dairy product, where the ingredient mix is packaged while in liquid form and solidifies when heated in the packaging. This method improves handling thereby saving costs.

The present invention also provides a sliceable dairy product with a long shelf-life without the use of preservatives.

Further, the invention provides a tofu-like product based on milk. The product has the same or similar consistency, taste and appearance, and is suitable for the same applications as soy-based tofu.

The present inventive method has utility for producing a food in an efficient and safe manner.

Thus, one aspect of the invention relates to a method of producing a sliceable dairy food product, said method comprising the steps of:
a) preparing a liquid ingredient mix which comprises milk and supplemental whey protein,
b) bringing the ingredient mix to a temperature of not more than 70° C.;
c) adjusting the pH to a value in the range of from 5.5 to 8.0;
d) optionally adding salt;
e) homogenizing the ingredient mix;
f) filling the ingredient mix into packaging, and
g) heating the ingredient mix in the packaging to a temperature in the range of from 90° C. to 155° C.,
h) maintaining the ingredient mix at the temperature selected in g) for a time period in the range of from 30 seconds to 9 hours, thereby forming a sliceable dairy food product.

A further aspect of the invention relates to a sliceable dairy food product obtainable by the method.

BRIEF DESCRIPTION OF THE FIGURES

FIG. 1 shows an overview of one embodiment of the method of invention. The dotted lines indicate where the process can be held over night.

DEFINITIONS

Figure 1A:
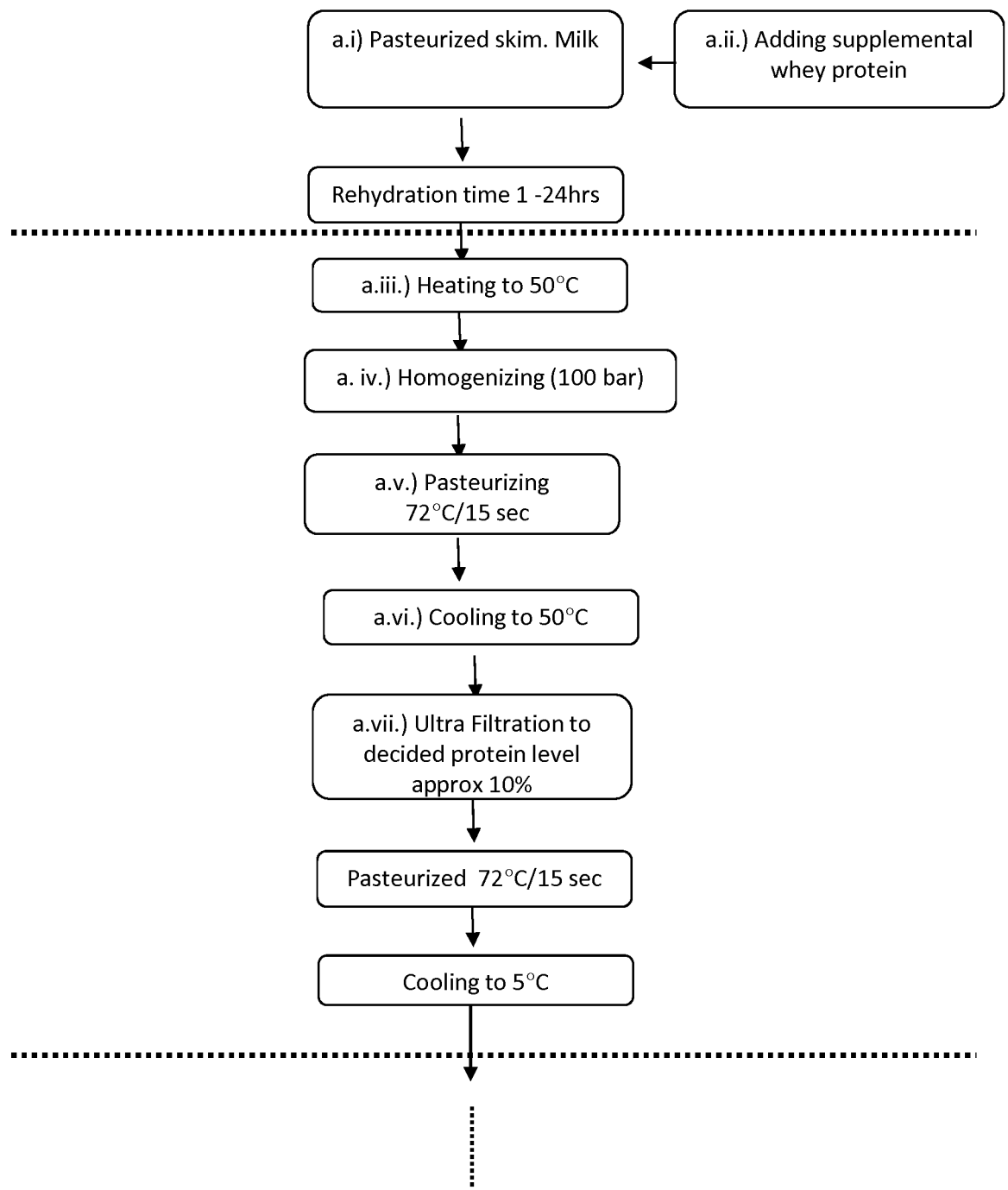
FIG. 1A shows an example of Step a) of a method according to the invention (preparing a liquid ingredient mix) wherein the liquid ingredient mix is prepared from liquid milk.
Figure 1B:
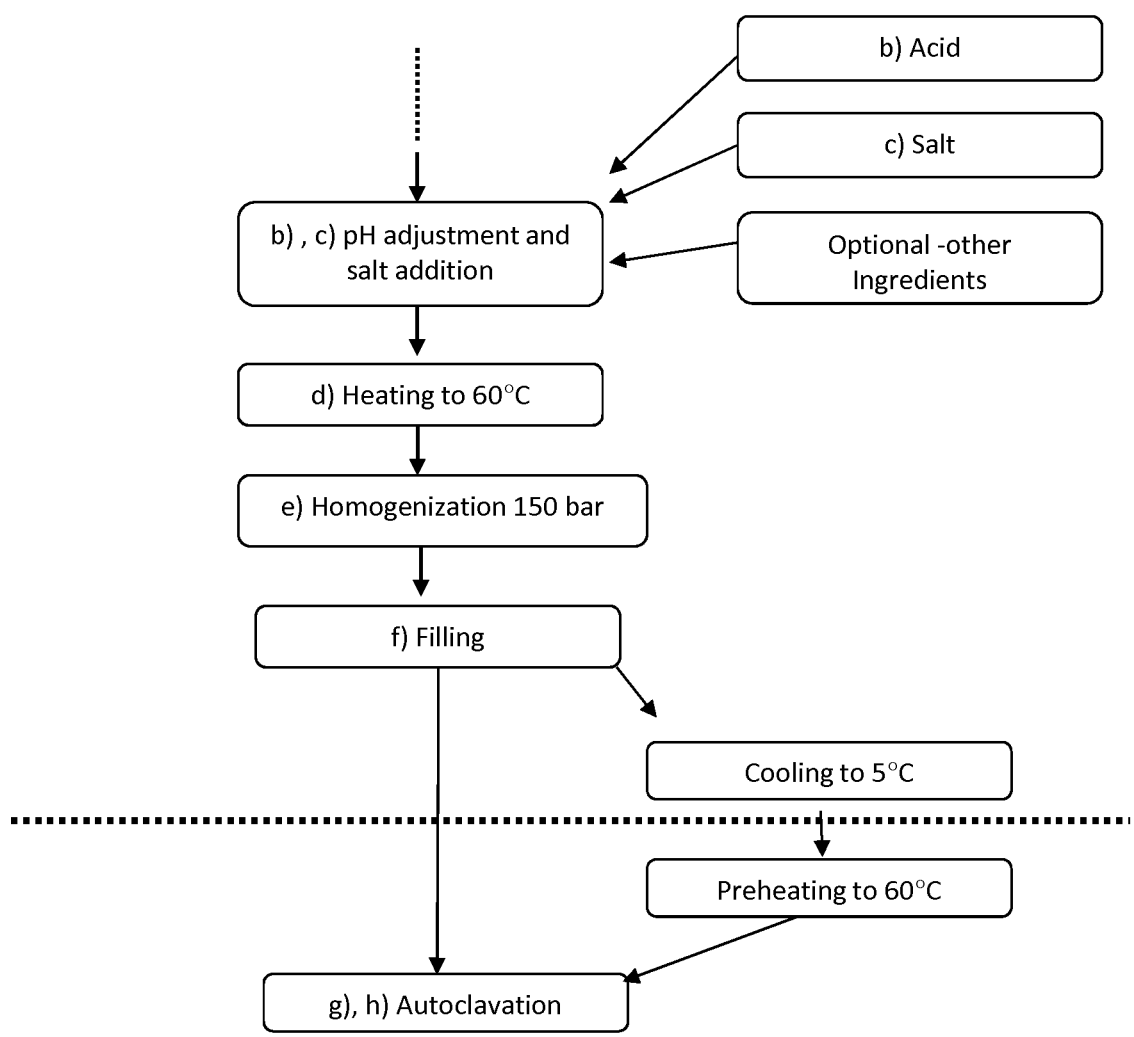
FIG. 1B shows an example of the further steps of a method according to the invention.

Prior to discussing the present invention in further details, the following terms and conventions will first be defined.

In the context of the present invention, mentioned percentages are weight/weight percentages unless otherwise stated.

The term "and/or" used in the context of the "X and/or Y" should be interpreted as "X", or "Y", or "X and Y".

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 1 to 8, from 3 to 7, from 4 to 9, from 3.6 to 4.6, from 3.5 to 9.9, and so forth.

All references to singular characteristics or limitations of the present invention shall include the corresponding plural characteristic or limitation, and vice versa, unless otherwise specified or clearly implied to the contrary by the context in which the reference is made.

Unless defined otherwise, all technical and scientific terms used herein have the same meaning as commonly understood by one of ordinary skill in the art.

"Whey" refers to the liquid remaining after milk has been curdled and strained. It may be "sweet" or "acid", and contains mainly lactose in water, with minerals and protein.

The term "whey protein" refers to the protein component of whey. It is typically a mixture of beta-lactoglobulin (~65%), alpha-lactalbumin (~25%), and serum albumin (~8%)

The term "whey protein concentrate" (WPC) pertains to a composition which contains increased amount of whey protein compared to whey, and typically at least 80% (w/w) of the total protein which was present in original milk serum, sweet whey, or acid whey.

The term "denatured whey protein" refers to whey protein which has been denatured, for example by exposure to heat. The denaturation allows hydrophobic interactions between whey protein and other proteins.

The term "edible acid" refers to an acid suitable for use in preparing foods for human consumption. Examples of edible acids are for example organic acids, such as citric acid, malic acid, tartric acid, acetic acid, oxalic acid, lactic acid, tannic acid, caffeotannic acid, butyric acid, benzoic acid, glucono delta lactone; as well as phosphoric acid. Edible acids may also be referred to as food grade acids, and the terms are used interchangeably herein.

The term "minutes" is shortened to "min" or "mins", and the term "seconds" is shortened to "sec" or "secs".

DETAILED DESCRIPTION OF THE INVENTION

Method of Preparing a Sliceable Dairy Food Product

The invention in a first aspect relates to a method of producing a sliceable dairy food product, said method comprising the steps of:
a) preparing a liquid ingredient mix which comprises milk and supplemental whey protein,
b) bringing the ingredient mix to a temperature of not more than 70° C.;
c) adjusting the pH to a value in the range of from 5.5 to 8.0;
d) optionally adding salt;
e) homogenizing the ingredient mix;
f) filling the ingredient mix into packaging, and
g) heating the ingredient mix in the packaging to a temperature in the range of from 90° C. to 155° C.,
h) maintaining the ingredient mix at the temperature selected in g) for a time period in the range from 30 seconds to 9 hours, thereby forming a sliceable dairy food product.
Step a) Preparing the Liquid Ingredient Mix
Milk The liquid ingredient mix comprises milk. The milk may be from any suitable source, such as cow's milk, goat's milk, sheep's milk, buffalo milk etc. The milk may be provided in any suitable form, such as liquid form or dry form. Examples of liquid forms of milk comprise skimmed milk, whole milk, raw milk, condensed milk etc. The liquid milk may be pasteurized. Examples of dry forms of milk include powdered milk, such as powdered skimmed milk.

One embodiment of the invention relates to a method wherein in step a) the liquid ingredient mix is prepared using milk in liquid form.

In another embodiment, the invention relates to a method wherein in step a) the liquid ingredient mix is prepared using milk in dry form, such as skimmed milk powder, buttermilk powder.

These embodiments are discussed further below, see heading "Further embodiments of step a)".

It is also envisaged that the liquid ingredient mix may be prepared in step a) using a combination of milk provided in liquid form and in dry form. Thus, the liquid ingredient mix may be prepared using liquid milk, dry milk, or a combination thereof.

The liquid ingredient mix may be primarily made up of milk. For example, the liquid ingredient mix may contain milk in the range of for example from 50% to 95% milk, such as from 60 to 95%, from 70 to 95%, from 80% to 95%, from 85% to 95%, from 90% to 95%, from 94% to 95%, such as for example about 95%, all percentages indicating w/v %.

In a further embodiment, the liquid ingredient mix consists essentially of milk and supplemental whey protein, or for example consists of milk and supplemental whey protein.
Supplemental Whey Protein The liquid ingredient mix further comprises supplemental whey protein. This supplemental whey protein is in addition to the whey protein which is imparted by the provision of milk.

In some embodiments, the ratio of volume milk to volume of supplemental whey protein may be for example in the range of from 90:10 of milk to supplemental whey protein, to 10:90 of milk to supplemental whey protein; such as from 80:20 of milk to supplemental whey protein to 20:80 of milk to supplemental whey protein; such as from 70:30 of milk to supplemental whey protein to 30:70 of milk to supplemental whey protein; such as for example such as from 60:40 of milk to supplemental whey protein to 40:60 of milk to supplemental whey protein; such as from 55:45 of milk to supplemental whey protein to 45:55 of milk to supplemental whey protein; or such as 35:65, 40:60, 45:55, 50:55, 50:50, 55:50, 60:40; 65:35, 70:30, 80:20, or 90:10 of milk to supplemental whey protein.

In particular embodiments, the ratio of volume milk to volume of supplemental whey protein is in the range of 30:70 of milk to supplemental whey protein to 70:30 of milk to supplemental whey protein; such as for example such as from 60:40 of milk to supplemental whey protein to 40:60 of milk to supplemental whey protein; such as from 55:45 of milk to supplemental whey protein to 45:55 of milk to supplemental whey protein, such as for example 35:65, 40:60, 45:55, 50:55, 55:50, 60:40; 65:35 or 70:30 of milk to supplemental whey protein.

The supplemental whey protein which is added may be any suitable whey.

Without wishing to be bound by theory, it is believed that casein glycomacropeptide (cGMP) may inhibit gelation/coagulation.

Therefore, in some embodiments of the invention, the supplemental whey has a level of cGMP which is no more than 15% w/w by dry weight of the supplemental whey protein; such as for example no more than 12%, no more than 10%, no more than 8%, no more than 6%, no more than 5%, no more than 4%, no more than 3%, such as no more than 2% or no more than 1%.

Casein glycomacropeptide is a peptide formed when casein is cleaved by chymosin. This peptide is formed in cheese or casein making. A major source of CGMP is sweet whey, which is a by-product from making of rennet types of cheeses.

In one embodiment, the supplemental whey protein provided is from acid whey. Acid whey is a by-product from the making of acid types of dairy products such as cottage cheese or strained yoghurt, and comprises essentially no cGMP. In contrast sweet whey is not suitable because it contains levels of cGMP which will inhibit the gelling. In another embodiment, the use of sweet whey in the present invention is excluded.

In some embodiments of the invention, the content of cGMP in the final product is not more than 6%, such as not more than 5%, not more than 4%, not more than 3%, not more than 2%, not more than 1%, not more than 0.5%, not more than 0.2% not more than 0.1%, or for example essentially 0% by weight.

The liquid ingredient mix may contain denatured whey protein. The source of the denatured whey protein in the liquid ingredient mix may be from the milk, from the supplemental whey protein, or from a combination of these. In a preferred embodiment, the source of the denatured whey protein in the liquid ingredient mix is from the supplemental whey protein.

In another embodiment, the liquid ingredient mix does not contain denatured whey protein. The liquid ingredient mix may in one embodiment be subjected to whey protein denaturing conditions during the method of the invention.

In another embodiment, the supplemental whey is subjected to denaturing conditions before being added to the liquid ingredient mix.

In one embodiment, the supplemental whey comprises denatured whey protein. All or part of the supplemental whey protein may be denatured. For example, at least 50% by dry weight of the supplemental whey protein may be denatured, or for example at least 55%, at least 60%, at least 75%, at least 80%, at least 90% or at least 95%; or for example from 50 to 95%, such as 55 to 85%, or 60 to 96%, or 70 to 85% or 80 to 95% by dry weight. The denaturing of the whey proteins leads to improved gelling properties of the whey.

In other embodiments, the liquid ingredient mix further comprises hydrocolloids. Addition of hydrocolloids could reduce the amount of supplemental whey protein necessary for the product to become firm during heating.

Hydrocolloids may for example be one or more selected from the group consisting of agar-agar, pectin, gelatin, locust bean gum, xanthan gum, guar gum, carrageenan, cellulose derivatives such as carboxymethyl cellulose, alginate and starch. For example, up to 75% by dry weight of the supplemental whey protein may be replaced by hydrocolloids, or for example, up to 70%, up to 65%, up to 60%, up to 55%, up to 50%, up to 45%, up to 40%, or for example 5 to 50%, such as 5 to 40%, 6 to 30%, 10 to 25% or 10 to 20%.

For example, hydrocolloids may constitute up to 20% by weight of the final product; such as for example up to 18%, up to 16%, up to 14%, up to 12%, up to 10%, up to 8%, up to 6%, up to 4%, up to 2%; or for example constitute in the range from 2 to 19%, 3 to 15%.

The proportion of supplemental whey protein, for example supplemental denatured whey protein, may be chosen such that at least 50% of the protein in the final sliceable product is from the supplemental whey protein. In other embodiments at least 50%, such as from 50 to 70%, such as from 50 to 65%, such as from 50 to 60%, such as from 50 to 55%, such as about 50%, such as 55%, 60%, 65% of the protein in the final product is from the supplemental whey protein.

In specific embodiments, the ratio between protein coming from the milk and protein coming from the supplemental whey protein, is in the range of from 30:70 of milk protein to supplemental whey protein, to 70:30 of milk protein to supplemental whey protein; such as for example from 60:40 of milk to supplemental whey protein to 40:60 of milk to supplemental whey protein; such as from 55:45 of milk to supplemental whey protein to 45:55 of milk to supplemental whey protein; such as for example 35:65, 40:60, 45:55, 50:55, 55:50, 60:40; 65:35 or 70:30 of milk protein to supplemental whey protein.

In one preferred embodiment, the ratio of the milk protein to supplemental whey protein is 50:50.

In one example, the supplemental whey protein is a WPC powder such as one or more selected from WPC 85, WPC 70, WPC 60, or Nutrilac, for example Nutrilac QU7660 (from Arla foods). The number 85, 70 or 60 in the WPC designation refers to that this percentage of the dry weight is made up of protein. Thus, WPC 85 is a WPC where 85% of the dry weight is protein.

In one embodiment, a solution of a WPC powder in water is prepared and mixed with the milk. The concentration of supplemental whey protein in such a solution may be for example from 2% (weight/volume) to 20%, such as from 2 to 18, 2 to 15, 2 to 14, 2 to 12, 2 to 10, 2 to 8, 2 to 6, 2 to 4, 2 to 3% protein weight/volume, or for example 6 to 20%, 6 to 16, 6 to 10, 8 to 10% protein weight/volume %. In particular embodiments the solution has a concentration of 10% (weight/volume) supplemental whey protein.

The amount of protein in the liquid ingredient mix which is prepared in step a) of the method for preparing a sliceable dairy food product according to the invention described above, may be for example from 2% (weight/volume) to 20%, such as from 2 to 18, 2 to 15, 2 to 14, 2 to 12, 2 to 10, 2 to 8, 2 to 6, 2 to 4, 2 to 3% protein weight/volume, or for example 6 to 20%, 6 to 16, 6 to 10, 8 to 10% protein weight/volume %.

In further embodiments, at least 35% of the protein in the final product is from supplemental whey protein and the remaining protein is from milk.

In particular embodiments, the liquid ingredient mix prepared in step a) has a protein content of from 10% to 12% (weight/volume), for example 10%.

In further particular embodiments, the protein content of the liquid ingredient mix consists of protein from milk and supplemental whey protein.

In yet further particular embodiments, the ratio of the protein from milk to the supplemental whey protein in the liquid ingredient mix is in the range of from 40:60 to 60:40, such as 50:50.

Thus preferred embodiments relate to the method of the invention wherein the liquid ingredient prepared in step a) has a protein concentration of 10% to 12% (weight/volume), for example 10%, wherein the protein content of the liquid ingredient mix consists of protein from milk and supplemental whey protein, and further wherein the ratio of the protein from milk to the supplemental whey protein is in the range from 40:60 to 60:40, such as 50:50.

Step b) Adjusting pH

The pH of the ingredient mix is adjusted to a value of at least 5.5, such as in the range from 5.5 to 8.0, for example from 5.5 to 7.5, 5.5 to 7.6, 5.8 to 7.8, 6.0 to 7.8, 6.0 to 7.6, 6.0 to 7.5, 6.0 to 7.4, 6.0 to 7.3, 6.0 to 7.2, 6.0 to 7.0; or for example at least 5.8, such as in the range from 5.8 to 7.8, 5.8 to 7.6, 5.8 to 7.5; or further for example in the range from 5.8 to 7.4, 5.8 to 7.3, 5.8 to 7.2, 5.8 to 7.0; or for example in the range 5.7 to 6.5, 5.8 to 6.5, 5.8 to 6.4; or 5.7 to 6.4, 5.7 to 6.3, 5.7 to 6.2, or 5.8 to 6.3, or 5.8 to 6.2, or about 5.7, 5.8, 5.9, 6.0, 6.1, 6.2, 6.3, 6.4, 6.5, 6.7, 6.8, 6.9 or 7.0.

The pH may be adjusted by the addition of for example an edible acid, such as for example selected from the group of lactic acid, Glucono delta lactone (GDL), citric acid, acetic acid; preferably citric acid.

The addition of acid does not coagulate the proteins or cause stiffening of the dairy food product and formation of the sliceable dairy food product. The pH may affect both the shelf-life and the consistency of the final product. Lower pH increase the shelf-life, but also compromise the texture of the final product. If the pH is too low, for example below 5.5, the final product will have a very sandy, gritty consistency which is undesirable, or may be not firm enough and too soft.

Step c) Optionally Adding Salt

In some embodiments salt may be added to the ingredient mix. Salt is typically added in the form of sodium hydrochloride (NaCl), though any desired salt may be used. The salt adds desired taste and consistency. In embodiments with lower salt, such as from 0 to 1% are useful in applications where low salt taste is required. Embodiments with higher salt, such as above 1% salt, for example from 1.5% to 5% salt, are useful in applications where more salty taste is desired.

The salt content may be for example from 0 to 5% w/w. The salt content may for example be from 0 to 1%, such as 0 to 0.9%, 0 to 0.8%, 0 to 0.7%, 0 to 0.6%, 0 to 0.5%, 0 to 0.4%. 0 to 0.3%, 0 to 0.2%, 0 to 0.1%. In other embodiments, the salt may for example be above 1%, such as 1.5 to 5%, 2 to 5%, 2.5 to 5%, 3 to 5%, 4 to 5%; or for example about 1%, 2%; 3%, 4%, or 5%.

Steps b) and c) may be performed simultaneously, or salt may be added before pH adjustment, or vice versa.

Further optional ingredients may be added at this point also. For example, green tea extract may be added. Such extracts may improve the final products by protecting against browning due to Maillard reaction in the heating step. One example of green tea extract is Teavigo, which sold by DSM.

Step d) Bringing the Ingredient Mix to a Temperature at not More than 70° C.

The ingredient mix is brought to a temperature of not more than 70° C. Excessive heating can cause the mixture to gel, and the risk of premature gelling increases over 70° C. The temperature may be for example not more than 70° C., not more than 68° C., not more than 65° C., not more than 63° C., not more than 60° C., not more than 58° C., not more than 56° C., not more than 55° C., not more than 53° C., such as not more than 52° C., such as not more than 50° C. In other examples the temperature may be from 35 to 70° C. or 35 to 65° C., such as from 36 to 56° C., such as 38 to 56° C., such as 38 to 55° C., such as 40 to 55° C., such as 48 to 52° C., such as about 50° C.

If the ingredient mix has for example been subjected to a cooling step during step a) preparation of a liquid ingredient mix, then the ingredient mix might have to be heated in order to reach not more than 70° C. Alternatively, if the ingredient mix has been heated to above for example 70° C. during the preparation of a liquid ingredient mix in step a), then it may have to be cooled to reach a temperature of not more than 70° C.

The temperature is selected in step b) to be high enough that all the fat in the ingredient is melted, but still low enough to avoid coagulation of the ingredient mix. If the fat is not melted, this will compromise the texture of the final product.

Step e) Homogenizing the Mixture

The ingredient mix is homogenized prior to filling in packages. Homogenization may be performed in any way suitable, and the homogenization pressure may be in the range from at least 50 bars, such as from 50 to 150 bar; from 50 to 120 bar, such as from 50 to 100 bar; such as about 100 bar, 120 bar or 150 bar. The homogenization contributes to a smooth product texture.

The homogenization divides the fat particles into smaller sized particles, and as a result the product gets a white and appealing colour.

The homogenization may be at temperatures above the gelling temperature, but since the time is so short (typically below 2 minutes, such as 90 seconds, 80 seconds, 60 seconds, 45 seconds, 30 seconds, 20 seconds, 15 seconds, 10 seconds), premature gelling does not occur.

Step f) Filling the Mixture into Packaging

The ingredient mix is filled into the packaging, while still in liquid form and prior to coagulation of the ingredient mix. Filling the ingredient mix into the packaging while in the liquid form, provides process advantages. It is simpler to fill liquid into packages than to wrap individual pieces of a sliceable dairy product.

In one preferred embodiment, filling takes place in line with one or more of the other steps of the method.

Once the packages are filled they may be sealed. This may take place immediately after filling. Sealing immediately after filling ensures product safety. Once sealed the sliceable dairy food product contained within the package is protected from contamination. Further, sealing makes it easier to handle the packages containing the ingredient mixture, even before heat treatment and formation of the sliceable dairy product.

In some embodiments, the process may be paused here and the filled packages cooled and stored for a period of time before steps g) and h).

Step g) Heating the Mix in the Packaging

The method of the invention further comprises the step of heating of the ingredient mix after it has been filled into the packaging. The heating is to a temperature in the range of at least 73° C., such as at least 90° C., such as from 90 to 155° C., 90 to 150° C., 90 to 145° C., 90 to 130° C., 90 to 120° C., 95 to 120° C., 95 to 110° C.

In other examples the temperature is at least 121° C., for example from 121 to 155° C., 121 to 150° C., 121 to 145° C., 121 to 140° C., 121 to 130° C. In one example the heating is to a temperature in the range from 121 to 140° C., such as for example from 121 to 140° C., 122 to 140° C., 123 to 140° C., 124 to 140° C., 125 to 140° C.; or for example 121 to 130° C., 122 to 130° C., 123 to 130° C., 124 to 130° C., or 125 to 130° C.; such as for example 121° C., 122° C., 123° C., 124° C. and 125° C.

At temperatures of at least 121° C., there is increased killing of spores, leading to increased shelf-life.

In one embodiment of the invention, the heating does not take place directly after filling. For example, the filled packages may be sealed and/or cooled and stored for example over night before being heated.

The heating may also be in at least two steps, whereby the filled packages are first pre-heated to a temperature, for example a temperature in the range from 5 to 70° C., such as for example 50 to 60° C., for example about 60° C., and then heated to a higher temperature, such as cited above.

Step h) Maintaining the Ingredient Mix at the Temperature Selected in g) for a Period of Time.

The method of the invention further comprises the step of maintaining the ingredient mix at a selected temperature for a period of time.

Thus, the ingredient mix in the packaging may be maintained at a temperature to which it is heated for a certain period of time, thereby forming a sliceable dairy food product.

In one embodiment, the ingredient mix may be maintained at the selected temperature for a time in the range of from 30 seconds to 9 hours. In a further embodiment the time may be in the range of from 5 minutes to 9 hours.

The time period may before example at least 15 seconds, at least 30 seconds, at least 1 minute, at least 2 mins, at least 5 mins, at least 10 mins, at least 15 mins, at least 30 mins, at least 1 hour, at least 2 hours, at least 3 hours, at least 4 hours; such as for example from 90 mins to 4 hours, such as 90 mins to 3 hours, such as 90 mins to 2 hrs, such as 2 hours, or for example from 30 mins to 3 hours, such as 30 mins to 2 hours, such as 30 mins to 1 hr; or for example 5 to 90 mins, such as 5 to 60 mins, such as 5 to 40 mins, 5 to 30 mins, 5 to 15 mins; or for example 30 secs to 2 mins, 30 secs to 5 mins.

In some examples, the time period may be for example at least 5 mins, such as for 5, 6, 7, 8, 9, 10, 11, 12, 13 mins.

Thus, examples of incubation times include 90° C. for 2 hours, 95° C. for at least 2 hours, 140° C. for 5 to 15 mins, and 121° C. for 10 mins.

Incubation at the higher temperatures will shorten the time used for heating.

The packaging may be any suitable packaging, but must be able to withstand the temperatures, such as those mentioned above for the selected amount of time, in the heating step which takes place after the filling step. Preferably, the packaging should be sterilisable for example by heat and/or pressure, leading to a sterilized product within the packaging. The packaging may be for example be made from plastic. In one embodiment the packaging is made from plastic and is re-sealable.

The heating of the ingredient mix in the packaging results in the formation of the sliceable dairy product with an extended shelf life. The heating leads to the coagulation of the ingredient mix, and the formation of a firm product. The firm product is thus formed upon heating, and for example cooling times or setting is not necessary to achieve the sliceable product.

The heating also has the effect of killing of microbes present, leading to increased shelf-life of the product.

The method provides advantages over the known methods of producing sliceable dairy products, which are typically formed first and later packaged. The handling of already-formed sliceable dairy products is not as simple to automate as liquid filling of packages. In particular, the packaging of already formed sliceable dairy products requires the handling of these products, and this may lead to deformation and/or breakage of the products, which then must be discarded. Furthermore, the continued handling introduces risk of contamination.

Further Embodiments of Step a)

As mentioned above in the discussion of Step a), the liquid ingredient mix may be prepared from either liquid milk, dried milk, or a combination thereof. The preparation of the liquid ingredient mix may vary depending on the form in which the milk is provided, and embodiments of the invention are discussed below.

In the following, two alternative embodiments of step a) are described. In a first alternative embodiment, the liquid ingredient mix is prepared from liquid milk. In a second alternative embodiment, the liquid ingredient mix is prepared from dry or dried milk. Each embodiment comprises sub steps, described in the following under respective heading.

Preparing the Liquid Ingredient Mix from Liquid Milk.

The invention in some embodiments relates to methods of the invention where the liquid ingredient mix is prepared using liquid milk.

One example of a step a) where the liquid ingredient mix is prepared using liquid milk is shown in FIG. 1A.

When milk is provided in liquid form, the supplemental whey protein, which is typically provided in form of a dry powder, may be added to the liquid milk and mixed.

The liquid ingredient mix may be heated. Heating can cause the mixture to gel, and the risk of premature gelling increases over 70° C. Thus, the temperature may be for example not more than 70° C., not more than 68° C., not more than 65° C., not more than 63° C., not more than 60° C., not more than 58° C., not more than 56° C., not more than 55° C., not more than 53° C., such as not more than 52° C., such as not more than 50° C. In other examples the temperature may be from 35 to 70° C. or 35 to 65° C., such as from 36 to 56° C., such as 38 to 56° C., such as 38 to 55° C., such as 40 to 55° C., such as 48 to 52° C., such as about 50° C.

The risk increases also with increasing time.

The mixture may be homogenized and/or pasteurized, after which the mixture may be cooled.

The homogenization breaks the fat globules and leads to a more pleasing, white appearance. Furthermore, homogenization increases the water-binding capacities of the proteins, which is desirable. The homogenization may be performed under any suitable conditions, such as at a pressure of at least 50 bar, such as from 50 bar to 150 bar, such as from 70 to 120 bar, preferably 100 bar.

The pasteurization may be performed under any conditions suitable to achieve pasteurization. The temperature may for example be from 67 to 74° C., preferably 72° C. The duration of the temperature may be for a time period from 15 sec to 30 sec; preferably 15 sec. Thus, most preferably pasteurization is performed at 72° C. for 15 sec. Even though heating above 70° C. increases the risk of gelation, the pasteurization is performed for such short periods of time that gelation is avoided. Thus, at temperatures from 67 to 74° C. and time periods of 2 minutes or less, no gelation occurs.

After homogenization and pasteurization, the liquid mixture may also be concentrated via ultrafiltration.

In one embodiment of the method of the invention, lactose is removed from the liquid ingredient mix. Lactose may be removed by any suitable method. For example, lactose may be removed by a diafiltration step. If desired, lactose may be enzymatically degraded, for example by lactase treatment. Diafiltration and/or lactase treatment may take place after homogenization and pasteurization.

In one preferred embodiment, lactose is reduced or removed by a combination of diafiltration and enzymatic treatment.

Some embodiments of the invention relate to where the level of lactose is in the range from 0.5 to 5% such as from 1.4 to 4.7%, 1.5 to 4.5% or for example 0.5% to 2.5%, such as from 1.5% to 2%, or about 1.5% or about 2% by weight/volume %.

The diafiltration step furthermore removes whey from the ingredient mixture, thereby increasing the dry matter content.

The protein content of the ingredient mix after the concentration step may be at least 6%, such as at least 7%, such as at least 8%, such as at least 9%, such as at least 10%, such as from 6 to 12%, such from 7 to 12%, such as from 7 to 11%, such as from 8 to 10%, such as 9 to 10%, such as 10% w/v. In a preferred embodiment the protein content of the final product is 10% w/v.

Measured in another manner, the proportion of supplemental whey protein, for example supplemental denatured whey protein may be chosen such that at least 35% of the protein in the concentrate after ultrafiltration and/or diafiltration is from the supplemental whey protein. In other embodiments at least 35%, such as from 35% to 70% of the protein in the ultrafiltration concentrate is from the supplemental whey protein, for example 35 to 60%, 35 to 55%, 35 to 50%, 40 to 50%, about 50% of protein by dry weight is from supplemental whey protein, for example supplemental denatured whey protein.

The protein content of the ingredient mix after the concentration step corresponds largely to the protein concentration of the final product. Thus, one means of manipulating the protein content of the final product is by controlling the diafiltration step above.

Thus, in one embodiment the invention relates to a method of the invention wherein in step a) the ingredient mix is prepared using milk in liquid form and step a) comprises the sub-steps of a.i.) Providing milk in liquid form a.ii.) Adding supplemental whey protein, such as denatured whey, such as QU7660.

a.iii.) Heating the mixture of step a.ii) to a temperature of not more than 70° C., such as not more than 50° C., such as in the range from 35 to 50° C., such as about 50° C.

a.iv.) homogenizing the mixture from step a.iii)

a.v.) pasteurizing the mixture from step a.iv)

a.vi.) optionally cooling the mixture from step a.v)

a.vii.) diafiltrating and ultrafiltration of the mixture from step a.vi).

In a preferred embodiment lactose is reduced or removed via diafiltration in step a.vii). In an even further preferred embodiment, an enzymatic treatment step is inserted after diafiltration, for example a lactase treatment step.

In a further embodiment the method of the invention relates to a method wherein step a.vii) leads to a protein content of at least 6% w/v, such as at least 8%, such as at least 10%, such as from 6 to 12%, such as from 7 to 11%, such as from 8 to 10%, such as 9 to 10%, such as 10% w/v. In other examples the protein content may be from 8 to 20%, such as 8 to 18%, such as 10 to 18%, such as 10 to 16%, such as 12 to 16%, such as 12 to 14%. In a preferred embodiment step a.vii) leads to a protein content of 10% w/v.

The method of the invention further relates to a method comprising a step a) comprising the sub-steps a.i) to a.vii) according to the above, the method further comprising the steps b) through h) as described elsewhere herein.

After concentration via ultrafiltration, the ingredient mix is pasteurized. Furthermore, the ingredient mix may be cooled. The ingredient mix may then be stored overnight at 5° C., and the process be taken up again for example the next day.

In one embodiment, GR60 membrane from DSS/Tetra (Molecular weight cut off=20000 Da) may be used for ultrafiltration and/or diafiltration. In some embodiments, the same membrane is used for ultrafiltration and diafiltration. Alternatively, the ultrafiltration and diafiltration may be done using different membranes. In large scale production, typically ultrafiltration and diafiltration will be done using different membranes.

The proportion of supplemental whey protein, for example supplemental denatured whey protein may be chosen such that at least 35% of the protein in the concentrate after ultrafiltration and/or diafiltration is from the supplemental whey protein. In other embodiments at least 40%, or for example from 35% to 45% of the protein in the ultrafiltration concentrate is from the supplemental whey protein, such as 36 to 41% by weight.

Preparing the Liquid Ingredient Mix from Dry Milk.

In some embodiments of the invention, the liquid ingredient mix is prepared using milk in dry form, for example powdered milk. When milk is provided in dry form, the step a) of preparing a liquid ingredient mix will comprise a reconstitution step, where the dry milk is reconstituted in a liquid, preferably water.

Thus, the invention also relates to methods of the invention, wherein the preparing of a liquid ingredient mix comprising milk and supplemental whey comprises the steps of:

a) Mixing water, milk in dry form and the supplemental whey protein.

In further examples of embodiments, fat, which may for example be one or more milk fat and/or vegetable fat, such as butter, oil (such as palm oil and/or rapeseed oil) and/or cream, is added to the milk in dry form, water and the supplemental whey protein. Such embodiments may comprise the steps of a) melting fat by adding and/or mixing with water which is heated to a temperature not more than 70° C., for example in the range of from 30° C. to 70° C.

The heating of the water should be enough to melt the fat, but not so much as to cause the gelling of the milk proteins and the ingredient mix. The temperature of the water or mixture may therefore not be more than 70° C. In embodiments of the invention, the temperature may be for example not more than 65° C., not more than 60° C., not more than 55° C., not more than 50° C. In one embodiment the heating is to a temperature in the range of from 30° C. to 70° C.

The milk in dry form and/or supplemental whey protein may be mixed with the fat and water. The order in which the ingredients are added are not critical. The milk in dry form and/or the supplemental whey protein may be added to the mixture prior to the melting of the fat, simultaneously with the fat, or subsequent to the melting of the fat. Typically, fat is dispersed in water, before the dry milk is added. This emulsifies the fat into the product.

The mixture may be homogenized and pasteurized. In one preferred embodiment, the mixture is led by rotation through a perforated stator surrounding a high speed motor (for example a rotator stator, for example a Scanima TX). This procedures leads to the simultaneous homogenization and pasteurization of the mixture. The procedure also contributes to a very smooth texture of the final product.

The pasteurization may be performed by heating to a temperature of from 60° C. to 70° C., such as from 65° C. to 70° C., such as from 65° C. to 68° C., such as about 35° C., about 66° C., about 67° C., or 68° C. This temperature may be held for a time in the range of from 30 mins to 60 mins, such as for about 30 to 40 mins, such as about 30 mins, about 35 mins, about 40 mins, about 45 mins. The heating may for example by direct steam.

Thus, in one embodiment, the invention relates to a method, wherein the pasteurization is performed by heating by direct steam to a temperature from 60° C. to 70° C. for 30 to 60 minutes. In a further embodiment, the invention relates to a method wherein the pasteurization is performed by heating by direct steam to 65° C. for 30 mins.

Thus, in one embodiment, the invention relates to a method of the invention wherein in step a) the ingredient mix is prepared using milk in dry form and step a) comprises the sub-steps of:
- a.i.) heating water to a temperature to not more than 70° C., for example in the range from 30 to 70° C.
- a.ii.) adding of fat to the water
- a.iii.) adding milk in dry form and supplemental whey protein to the mixture obtained in step a.ii) and mixing
- a.iv.) homogenizing the mixture from a.iii)
- a.v.) pasteurizing the mixture from a.iv)

A further embodiment relates to a method according to the invention, wherein the homogenization is performed by rotator stator.

In the case where the milk is provided in dry form, such as a milk powder, the amount of partially denatured whey protein may be least 3.5% by weight.

Method of Preparation of Denatured Supplemental Whey

In another aspect, the invention relates to a method of preparing denatured supplemental whey, comprising the steps of
- I. Preparing a liquid comprising whey protein,
- II. Lowering the pH of the liquid from step I. by addition of one or more edible acids,
- III. Optionally homogenizing the liquid from step II.
- IV. Ultra-high temperature (UHT) treatment of the liquid from step II. or III,
- V. Cooling the UHT treated liquid of step IV. and
- VI. Adjusting the pH of the liquid from step V.

The resulting preparation of whey is useful for adding as supplemental whey in the methods of preparing a sliceable dairy product described elsewhere herein. This preparation has gelling properties which improves the gelling of the sliceable dairy product.

Without wishing to be bound by theory, it is believed that casein glycomacropeptide may inhibit gelation/coagulation.

Therefore, in some embodiments of the invention, the whey protein in step I, and/or the liquid comprising whey protein of step I., has a level of cGMP (casein glycomacropeptide) which is no more than 15% w/w by dry weight of the whey protein; such as for example no more than 12%, no more than 10%, no more than 8%, no more than 6%, no more than 5%, no more than 4%, no more than 3%, such as no more than 2% or no more than 1%.

Casein glycomacropeptide is a peptide formed when casein is cleaved by chymosin. This peptide is formed when in cheese making. A major source of cGMP is sweet whey, which is a by-product from making of rennet types of cheeses.

In one embodiment, the whey protein provided in step I) is provided in the form of acid whey. Acid whey comprises essentially no cGMP.

In contrast sweet whey is not suitable because it contains levels of cGMP which will inhibit the gelling. In another embodiment, the use of sweet whey in the present invention is excluded.

In some embodiments of the invention, the content of cGMP in the final product achieved in step VI. is not more than 6%, such as not more than 5%, not more than 4%, not more than 3%, not more than 2%, not more than 1%, not more than 0.5%, not more than 0.2% not more than 0.1%, or for example essentially 0% by weight.

The liquid comprising whey protein prepared in step I, comprises whey protein in an amount from 8% to 12% weight/volume. In preferred embodiments, said liquid comprises whey protein in an amount of 10% weight/volume. The pH of the liquid prepared in step I) is lowered by addition of an edible acid. The edible acid may be selected from one or more of organic acids, such as citric acid, malic acid, tartric acid, acetic acid, oxalic acid, lactic acid, tannic acid, caffeotannic acid, butyric acid, benzoic acid, glucono delta lactone; as well as phosphoric acid. In particular embodiments, citric acid and/or lactic acid are used.

The pH is lowered to be in the range of from 2.5 to 5, such from 3 to 4, such as about 3.5.

The pH adjusted liquid may optionally be homogenized. Homogenization may be performed in any way suitable, and the pressure may be in the range from 0 to 150 bar; such as from 0 to 120 bar, 0 to 100 bar, 0 to 75 bar, 0 to 50 bar, 0 to 20 bar; or such as such as about 0 bar; or such as about 100 bar, 120 bar or 150 bar.

The pH-adjusted (and optionally homogenized liquid) is treated with ultra high temperature. The liquid may optionally be pre-heated before homogenization, for example to a temperature from 60 to 80° C., such as for example 70 to 75° C., such as about 75° C.

The UHT treatment may be for example by heating the liquid to a temperature exceeding 135° C. for a short period, such as not more than 10 seconds. The heating may for example be to a temperature from 135 to 145° C., 136 to 145° C., 138 to 145° C., or 136 to 144° C., 138 to 144° C.; or for example about 143° C., 144° C. or 145° C. The heating may be for a period of time not more than 10 seconds, such as from 1 second to 10 seconds, or for 3 to 4 seconds, or for example for 4 to 6 seconds. One particular embodiment relates to the method of the invention wherein the UHT treatment is at 144° C. for 4 to 6 seconds.

After the UHT treatment, the liquid of step V. is cooled. The cooling may be for example to below 18° C., such as for example to between 3° C. and 18° C., such as to a temperature in the range from 3 to 12° C., 4 to 11° C., 4 to 11° C., 5 to 10° C.; or for example to about 4, 5, 6, 7, 8, 9 or 10° C.

After cooling, the pH of the cooled UHT-treated liquid is adjusted again, typically by addition of sodium hydroxide (NaOH).

The pH is adjusted to a pH above 5, such as a pH in the range of from 5.5 to 7, such 5.5 to 6.8, 5.5 to 6.7, 5.7 to 6.7, 5.8 to 6.7, 6 to 6.5, 6.2 to 6.5, such as about 6.3, 6.3, 6.4, 6.5.

Thus, one preferred embodiment of the present method of the invention for preparing a denatured supplemental whey relates to wherein the method comprises the steps of:
- I. Preparing a liquid comprising whey protein in an amount of 10% weight/volume,
- II. Lowering the pH of the liquid from step I. by addition of one ore more edible acids, selected from one or more of citric acid and lactic acid,
- III. Optionally homogenizing the liquid from step II.
- IV. Ultra-high temperature (UHT) treatment of the liquid from step II or step III, wherein UHT treatment was at 144° C. for 4 to 6 seconds,
- V. Cooling the UHT treated liquid of step IV., wherein the cooling is to about 10° C.,
- VI. Adjusting the pH of the liquid from step IV, wherein the adjustment is done with sodium hydroxide, to a pH of 6.5.

Further Method of Preparing a Sliceable Dairy Food Product

The invention in a further aspect relates to a method of producing a sliceable dairy food product, said method comprising the steps of:
- 1.) Preparing denatured supplemental whey according to the above described method of the invention;

2.) Preparing a liquid ingredient mix by
   i) providing milk, such as for example a skimmed milk concentrate;
   ii) Ultrafiltrating, for example at 50° C.
   iii) Diafiltrating, for example to 2% lactose and 10% protein
   iv) optionally standardizing the milk fat, for example to 2.5% fat
   v) Optionally pre-heating the mixture from iv), for example to 75° C.,
   vi) Homogenization, for example at 150 bar
   vii) UHT treatment, for example at 144° C. for 4 seconds;
   viii) Optionally storing at 5° C.
3.) Mixing the denatured supplemental whey of step 1) with the liquid ingredient mix from step 2.);
4.) Filling the mix from step 3.) into packaging
5.) Heating the mix in the packaging
6.) Maintaining the ingredient mix at the temperature selected in step 5.) for a period of time.

What is described previously for milk also applies to the milk provided in step 2.i) in the present method.

The ultrafiltration and diafiltration may be performed at any suitable temperature, for example at 50° C.

The homogenization of step 2 vi) in the present method may be performed in any way suitable, and the pressure may be in the range from 0 to 150 bar; such as from 0 to 120 bar, 0 to 100 bar, 0 to 75 bar, 0 to 50 bar, 0 to 20 bar; or such as such as about 0 bar; or for example in the range of at least 50 bar, such as from 50 to 150 bar, 50 to 120 bar or 50 to 100 bar; or such as about 100 bar, 120 bar or 150 bar. The homogenization contributes to a smooth product texture.

The homogenization divides the fat particles into smaller sized particles, and as a result the product gets a white and appealing colour.

The UHT treatment of step 2vii) in the present method may be for example by heating to a temperature exceeding 135° C. for a short period, such as not more than 10 seconds. The heating may for example be to a temperature from 135 to 145° C., 136 to 145° C., 138 to 145° C., or 136 to 144° C., 138 to 144° C.; or for example about 143° C., 144° C. or 145° C. The heating may be for a period of time not more than 10 seconds, such as from 1 second to 10 seconds, or for 3 to 4 seconds, or for example for 4 to 6 seconds. One particular embodiment relates to the present method wherein the UHT treatment is at 144° C. for 4 seconds.

Some embodiments of this method of the invention relate to where the diafiltration in step 2.iii) leads to a level of lactose in the range from 5% to 0.5%, such as from 4.7% to 1.4%, 4.5% to 1.5%, or for example 0.5% to 2.5%, such as from 1.5% to 2%, or about 1.5% or about 2%.

Reduced lactose (as compared to milk, which has typically about 4.7% lactose) is desired because the product will be better tolerated by customers who are lactose-intolerant.

Further, lower levels of lactose lead to less browning due to Maillard reaction.

In one embodiment of this method of the invention, in step 3.), the denatured supplemental whey from step 1.) is mixed in equal amounts (volume based) with the liquid ingredient mix from step 2.).

Thus, in preferred embodiments the mix in step 3.) consists essentially of milk and denatured supplemental whey protein, or for example consists of milk and denatured supplemental whey protein.

In particular embodiments, the liquid ingredient mix prepared in step 3.) has a protein content of from 6% to 18%, such as 8 to 14%, such as 10% to 12% (weight/volume), for example 10%.

In further particular embodiments, the protein content of the liquid ingredient mix consists of protein from milk and denatured supplemental whey protein.

In yet further particular embodiments, the ratio of the protein from milk to the denatured supplemental whey protein in the liquid ingredient mix is in the range of from 40:60 to 60:40, such as 50:50.

Thus preferred embodiments relate to the method of the invention wherein the liquid ingredient prepared in step 3) has a protein concentration of 10% to 12% (weight/volume), for example 10%, wherein the protein content of the liquid ingredient mix consists of protein from milk and supplemental whey protein, and further wherein the ratio of the protein from milk to the supplemental whey protein is in the range from 40:60 to 60:40, such as 50:50. What has been described for steps f), g) and h) previously, applies also to the steps 4.), 5.) and 6.) respectively of this method.

In one embodiment, G60 membrane (Molecular weight cut off=20000 Da) may be used for ultrafiltration and/or diafiltration.

The advantage of this process is that since the ingredients are UHT-treated prior to filling, the heating (autoclavation) does not need to be as harsh and therefore avoids the problem with Maillard browning in the heating step. For example, the heating may be to temperatures in the range from 70 to 110° C., such as from 90 to 110° C., such as from 95° C. to 100° C.; for time periods such as from 45 minutes to 90 minutes, such as from 45 minutes to 75 minutes, such as from 50 minutes to 75 minutes, such as about 60 minutes.

The product may then be stored for example in cold storage, for example at between 3 and 18° C., such as from 4 to 12° C., preferably from 5 to 8° C.

Product Obtainable by the Method

The invention in another aspect relates to a dairy product obtainable by the methods of the invention, for example a sliceable dairy food product, or for example a sliceable dairy food product with an extended shelf life.

The product according to the invention is a sliceable dairy product, is produced without contribution from microbial cultures, such as bacteria and/or mold, and thus is essentially free from such microbes. Further, the product of the invention will also not contain rennet. Even further, the product of the invention does not have low pH associated with acid coagulated dairy products.

The product of the invention has a smooth, light texture and when sliced with a knife, falls cleanly away from the knife, with little or no adherence of the product to the knife (i.e. little to no stickiness). The product does not crumble, but splits evenly under pressure. The texture is reminiscent of boiled egg white, though less dense. Though the product of the invention may be sliced with a knife, it is not possible to use a cheese slicer, also known as a cheese plane.

The taste of the product may be neutral.

The product obtainable by the method will have a modulus G' of at least 2000, such as at least 2500, such as at least 2800. In some embodiments the product obtainable by the method has a modulus G' of from 2500 to 20000; such as for example from 2500 to 5000; or for example from 5000 to 20000; or for example from 2500 to 6500, such as from 3500 to 6050, from 3500 to 5000; or for example from 15000 to 20000.

The milk may be selected in accordance with the desired fat percentage and/or protein percentage of the final product.

Furthermore, fat, which may for example be one or more milk fat and/or vegetable fat, such as butter, oil and/or cream, may be added to the ingredient mix in order to increase the fat content of the final product. This may be done for example in the preparation of the liquid ingredient mix in step a).

The fat content of the product may be not more than 25% w/w, such as not more than 20%, not more than 17%, not more than 15%, not more than 12%, not more than 10%, not more than 8%, not more than 6%, not more than 5%, not more than 4%, not more than 3%, not more than 2%, not more than 1%. In other examples, the fat content may be from 0.1% to 20%, such as for example, the fat content may be 2%, 3%, 4%, 5%, 6%, 7%, 8%, 9%, 12%, 14%, 15%, 16%, 17%, 18%, 19%, 20%. In some embodiments, additional ingredients such as cream, fat, oil may be added to the ingredient mix. In one example one or more emulsifiers may be added, for example lecithin may be added.

One embodiment of the invention relates to a product of the invention wherein it has a pH of at least 5.5, such as in the range from 5.5 to 8.0, for example from 5.5 to 7.5, 5.5 to 7.6, 5.8 to 7.8, 6.0 to 7.8, 6.0 to 7.6, 6.0 to 7.5, 6.0 to 7.4, 6.0 to 7.3, 6.0 to 7.2, 6.0 to 7.0; or for example about 6.2, 6.3, 6.4, 6.5, 6.7, 6.8, 6.9 or 7.0.

The product obtainable by the method will contain protein contributed from the milk, including casein and whey protein. The product further comprises supplemental whey protein, for example Nutrilac QU7660.

The product of the invention may be characterized by the amount of protein present. The product of the invention may comprise an amount of protein which may be at least 6% (weight/volume), such as at least 7%, such as at least 8%, such as at least 9%, such as at least 10%, such as from 6 to 12%, such from 7 to 12%, such as from 7 to 11%, such as from 8 to 10%, such as 9 to 10%, such as 10%. In a preferred embodiment the protein content of the final product is 10% weight/volume.

In other examples, the product of the invention has a protein content in the range from 6% to 20%.

A protein content of below 6% would lead to a product which is too soft; if the protein content is over 20% then the food product of the invention would have too firm and gritty a consistency, which is undesirable.

In one embodiment, at least 40% of the total protein content should come from the supplemental whey protein. In one embodiment of the invention, at least 50% of the total protein content is from the supplemental whey protein.

The food product according to the invention may include one or more edible acids, Examples of edible acids include citric acid, malic acid, tartric acid, acetic acid, oxalic acid, lactic acid, tannic acid, caffeotannic acid, butyric acid, benzoic acid, glucono delta lactone, phosphoric acid, and sorbic acid.

The product of the invention has an extended shelf-life. The product of the invention may thus also be characterized by the shelf life. The process of sterilizing the product after filling leads to a product with extended shelf life as compared to products which are produced and then individually wrapped, such as products produced by traditional brick cheese production. Such cheeses typically have a shelf-life of some months. The shelf-life is also extended as compared to that of fresh tofu, which is typically around 1 month and/or fresh cheeses, which is typically from one to several days.

The product of the invention may for example have a shelf life of at least 6 months, such as at least 9 months, such as at least 12 months, such as at least 18 months, such as at least 24 months, such as at least 5 years.

In one embodiment, the shelf-life is calculated to be at least 5 years, for example at least 10 years.

The invention also relates to the dairy food product of the invention, such as the sliceable dairy food product, such as the sliceable dairy food product with an extended shelf life, comprised in the package.

"Comprised in the package" refers to the final product, i.e. the final formed sliceable dairy product, together with the packaging in which it was formed.

Thus, the invention relates in one embodiment to the sliceable dairy product obtainable or obtained by any method of the present invention, wherein said product is comprised in the package.

One embodiment of the invention relates to the sliceable dairy product obtainable or obtained by any method of the invention together with the package in which said product is comprised.

One embodiment of the invention relates to a sliceable dairy product obtainable or obtained by a method according to the invention, comprising milk and supplemental whey protein, an edible acid and optionally sodium chloride and/or sodium hydroxide. A further embodiment relates to a sliceable dairy product obtainable or obtained by a method according to the invention, consisting of milk and supplemental whey protein, an edible acid, and optionally sodium chloride and/or sodium hydroxide.

It should be noted that embodiments and features described in the context of one of the aspects of the present invention also apply to the other aspects of the invention. In particular, the embodiments and features described in connection with the method apply also to the product obtainable by the method.

Furthermore, the features described in the context of providing a liquid milk, may apply also to the context of providing a milk in a dry form.

All patent and non-patent references cited in the present application, are hereby incorporated by reference in their entirety.

The invention will now be described in further details in the following non-limiting examples and figures.

EXAMPLES

Example 1

Ultrafiltration Method (Preparing the Liquid Ingredient Mix From Liquid Milk)

TABLE 1

| Ingredients | |
|---|---|
| WPC (QU7660) | 5.10 kg |
| Skm. milk | 84.90 kg |
| Water | 90.00 kg |
| UF concentrate | 180.0 kg |

The mixture is concentrated to desired protein content (UF concentrate).

The UF concentrate was added to the Stephan cooker.

Example 2

Scanima Method (Preparing the Liquid Ingredient Mix from Dry Milk)

TABLE 2

| Ingredients | |
| --- | --- |
| WPC (QU7660) | 6.7 kg |
| Butter | 6.0 kg |
| MPC 85 (milk protein concentrate) | 5.4 kg |
| Water | 81.73 kg |

The water is heated to 50° C. and the butter added. The WPC and the water is mixed, by homogenisation. Finally the pH is adjusted to desired level.

Example 3

Different test products were made using the method of Example 1.

Test Product N20

20 kg of UF concentrate 8% protein+2.27 kg cream was heated to 50° C. in stephan cooker, homogenised at 150 bar, filled into packaging material and autoclaved for 9 min. at 125° C.

Test Product N22

20 kg of UF concentrate 8% protein+2.27 kg cream+50 g salt was heated to 50° C. in stephan cooker, homogenised at 150 bar, filled into packaging material and autoclaved for 9 min. at 125° C.

Test Product N23

20 kg of UF concentrate 12% protein+2.27 kg cream+300 g. citric acid (20% dilution) was heated to 50° C. in stephan cooker, homogenised at 150 bar, filled into packaging material and autoclaved for 9 min. at 125° C.

Test Product N24

20 kg of UF concentrate 12% protein+2.27 kg cream was heated to 50° C. in stephan cooker, homogenised at 150 bar, filled into packaging material and autoclaved for 9 min. at 125° C.

Test Product N25

20 kg of UF concentrate 12% protein+2.27 kg cream+50 g salt was heated to 50° C. in stephan cooker, homogenised at 150 bar, filled into packaging material and autoclaved for 9 min. at 125° C.

Test Product N26

20 kg of UF concentrate 10% protein+2.27 kg cream+180 g. citric acid (20% dilution)+25 g salt was heated to 50° C. in stephan cooker, homogenised at 150 bar, filled into packaging material and autoclaved for 9 min. at 125° C.

Test Product N27

20 kg of UF concentrate 10% protein+2.27 kg cream+180 g. citric acid (20% dilution)+25 g salt was heated to 50° C. in stephan cooker, homogenised at 150 bar, filled into packaging material and autoclaved for 9 min. at 125° C.

Test Product N28:

20 kg of UF concentrate 10% protein+2.27 kg cream+180 g. citric acid (20% dilution)+25 g salt was heated to 50° C. in stephan cooker, homogenised at 150 bar, filled into packaging material and autoclaved for 9 min. at 125° C.

Reference

A commercially available firm tofu, Tau Kwa Firm Tofu, was used as a reference.

TABLE 3

Modulus measurements for Test products

| Sample | Storage Modulus G | pH | Salt | Protein |
| --- | --- | --- | --- | --- |
| N20 | 4964 | 6.89 | — | 7.17 |
| N22 | 2805 | 6.88 | 0.29 | 7.23 |
| N23 | 17489 | 6.02 | — | 10.83 |
| N24 | 3643 | 6.84 | — | 11.3 |
| N25 | 15110 | 6.82 | 0.29 | 11.22 |
| N26 | 6033 | 6.27 | 0.16 | 8.92 |
| N27 | 4508 | 6.28 | 0.17 | 9.06 |
| Reference (Tau Kwa Firm Tofu) | 21854 | | | |

Rheology Measurements of Test Products

The principle of a controlled strain Rheometer measurement system is to deform the sample in a controlled and non-destructive manner and measure its elastic response G'.

Measurements were performed using a DHR-2 Rheometer from TA Instruments Ltd which was equipped with a plate/plate measurement system with a geometry dimension of 20 mm. Measuring temperature was 20° C.

A stainless steel cylinder gently cuts out a cylindrical sample of 20 mm in diameter directly from the sample container. A slice of 1 mm is cut of the sample and transferred to the rheometer.

Figure 2:
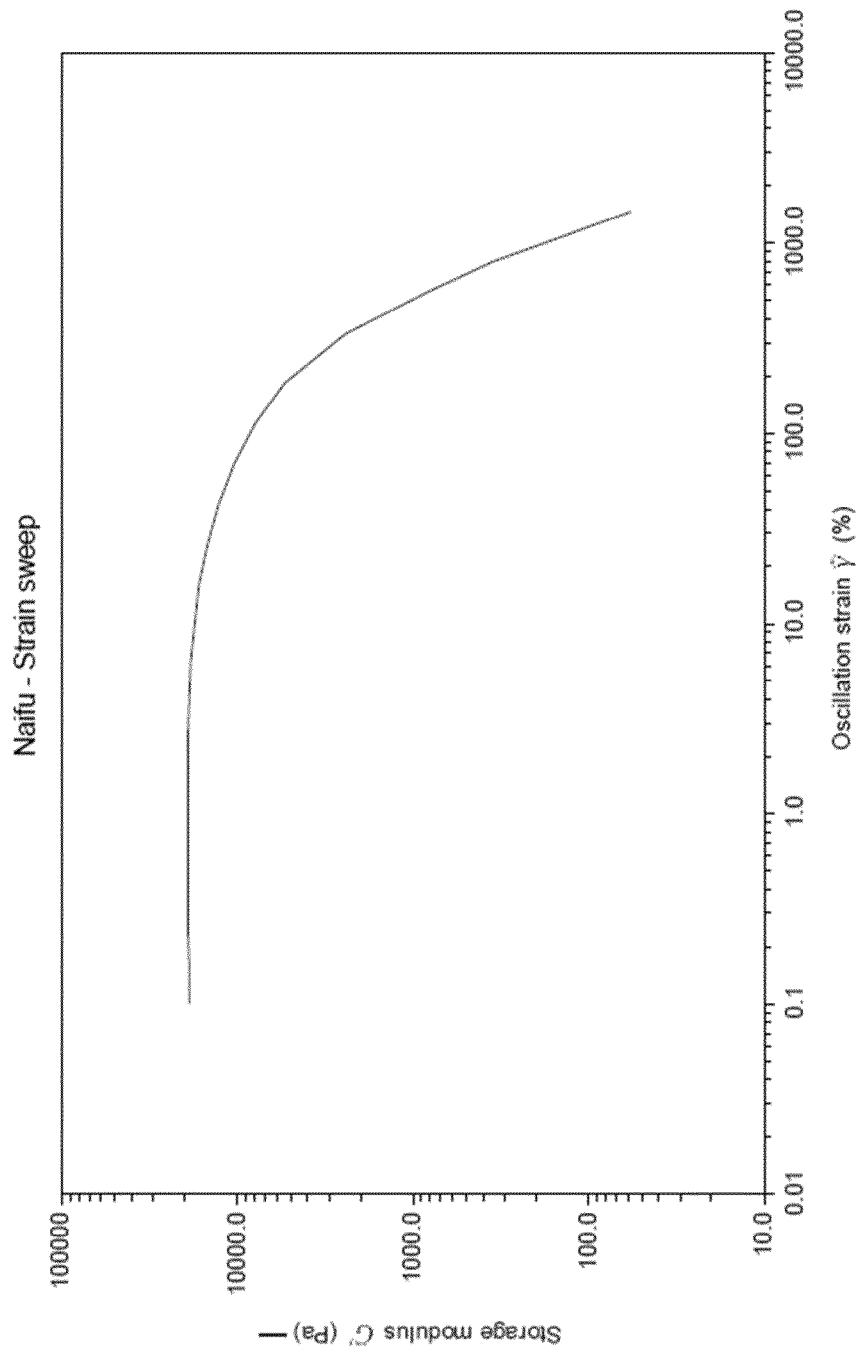
FIG. 2 shows a strain sweep performed to determine the viscoelastic regions of a test product.

In order to be able to compare the results performed on the Rheometer it is important to detect and carry out measurements within the viscoelastic linear region. In this region the structure of the sample will not be affected by deformation of the measurement. Thus, before the rheological characterization is made preliminary experiments were carried out to determine the viscoelastic regions (See FIG. 2). Based on the strain sweeps a strain value of 1% (0.01-/-) were chosen to perform the rheological characterization of the samples.

Setup:

Environmental system Peltier plate

Diameter 20 mm

Gap 1000.0 micrometer

Loading gap: 45000.0 micrometer

Trim gap offset: 50.0 micrometer

Plate material: Steel

Geometry: 20 mm Parallel plate, Cross hatch.

Minimum sample volume is 0.314159 mL

The sample was conditioned and then subjected to oscillation

Oscillation was at 20° C. The test parameterswere as follows:

Temperature: 20° C.; Soak time 0 s; Duration: 120 s; Strain 0.01

Single point; Frequency 0.1 Hz; Controlled strain type: Continuous oscillation (direct strain).

Motor mode: Auto

All samples were measured in duplicates and each sample consists of 6 measuring points.

Figure 3:
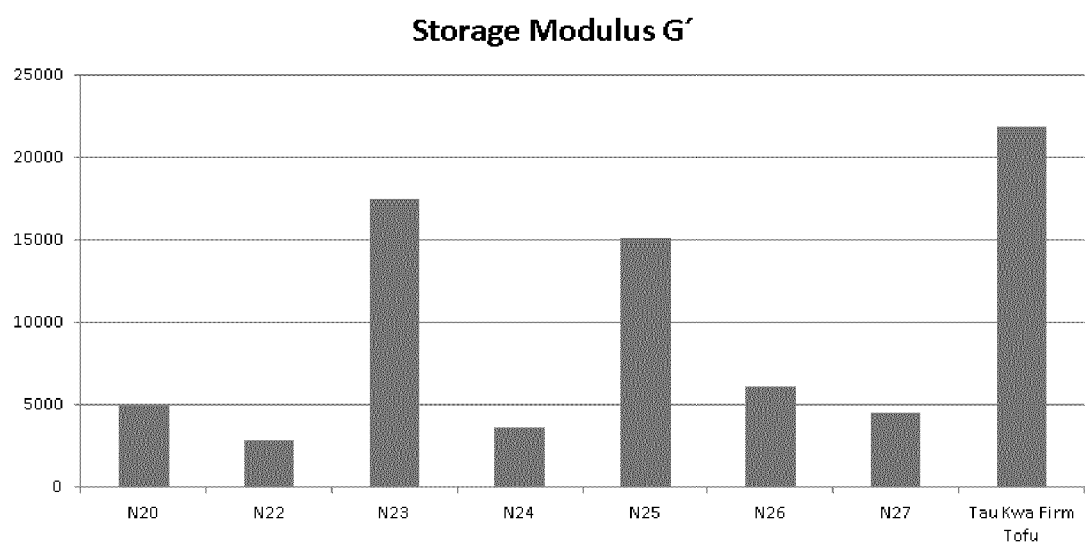
FIG. 3 shows the Storage Modulus measurements of various test products. See also Table 3.

Results are shown in Table 3 and in FIG. 3.

Example 4

Measurements were performed on the UF concentrate to determine the amount of whey protein in relation to the Whey and Casein protein content.

TABLE 4

Ratio of whey protein

| Test product | Casein (C) Areal | Whey protein (WP) Areal | Ratio WP/(WP + C) |
|---|---|---|---|
| A (4420 NAifu 8 1.d) | 43992 | 24990 | 36 |
| B (4420 Naifu 8 B.d) | 40215 | 25064 | 38 |
| C (4421 Naifu 10 A.d) | 45783 | 30845 | 40 |
| D (4421 Naifu 10 B.d) | 45696 | 31117 | 41 |
| E (4422 Naifu 12 A.d) | 53267 | 37613 | 41 |
| F (4422 Naifu 12 b.d) | 52661 | 37216 | 41 |

Example 5

Preparation of Samples

Samples were prepared according to different methods according to the invention.

Figure 4:
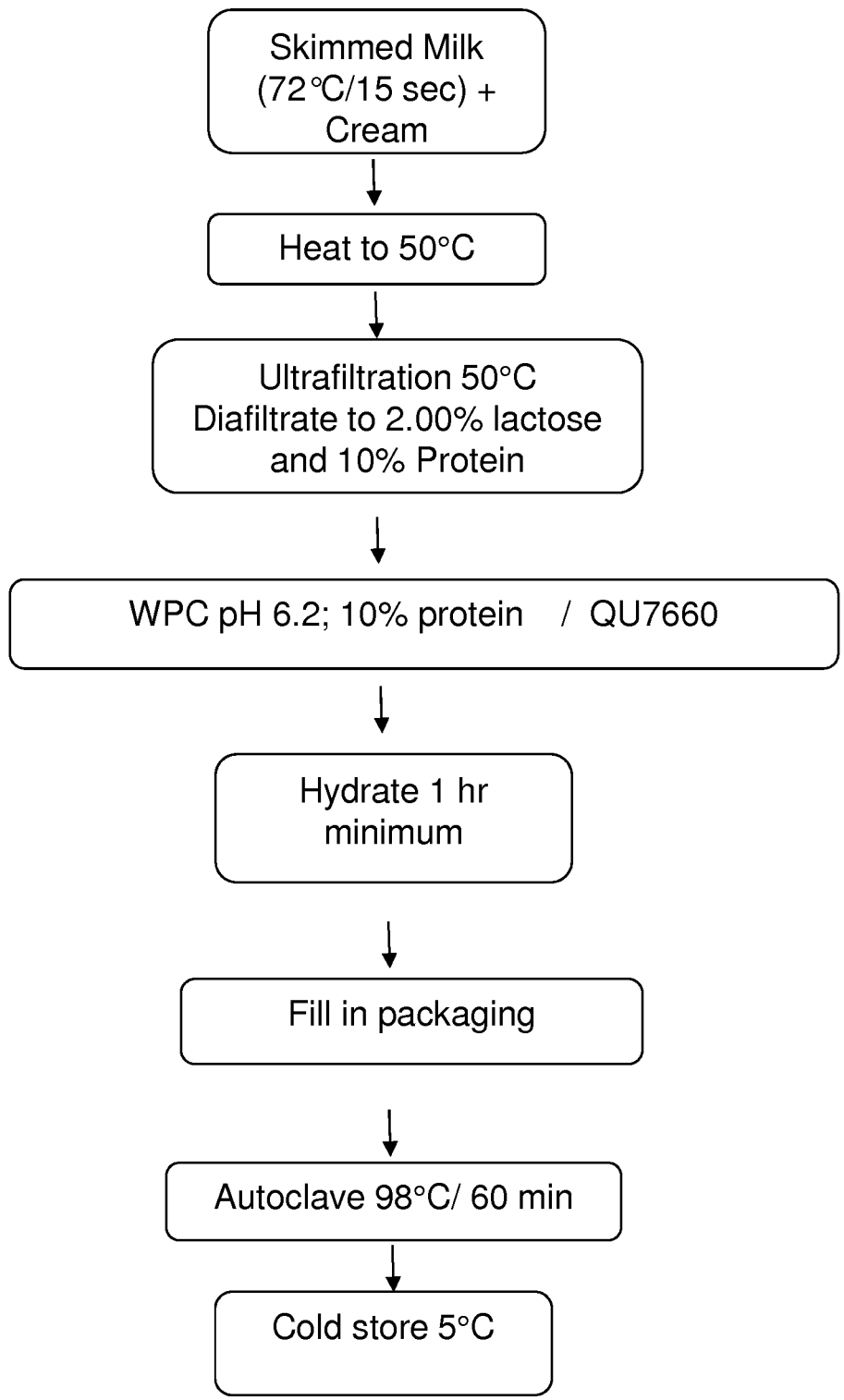
FIG. 4 shows a flow chart overview of one method according to the invention. See also Example 5.

Process 1A (See also FIG. 4):

Skimmed milk was heated to 72° C. for 15 seconds, and cream was added to standardize the milk to 0.7 to 0.8% fat weight/volume. This leads to a fat percentage in the final product in the range of from 2-3% weight/volume. The mixture of heated skimmed milk and cream was heated to 50° C. This was followed by a ultrafiltration performed at 50° C., and diafiltration to a level of 2.00% weight/volume lactose and 10% weight/volume protein in the retentate.

WPC was adjusted to pH 6.2 and 10% protein, and added to the mixture after ultrafiltration and diafiltration.

Hydration was allowed to take place for at least 1 hr, after which the mixture was filled in the packaging. The packaged mixture was autoclaved at 98° C. for 60 minutes, and then placed in cold storage (5° C.).

In a variation of Process 1A, the whey protein preparation used was QU7660. QU7660 was not pH adjusted, and only the protein level was adjusted to 10% protein.

Process 1B

Process 1B was performed in the same way as Process 1A up to and including hydration. After hydration the mixture is heated to 90° C. for 5 mins and a 0.7% solution of Glucono Delta Lactone is added. Thereafter the mixture is filled in the packaging and stored at 5° C. (not shown in FIG. 4).

Figure 5:
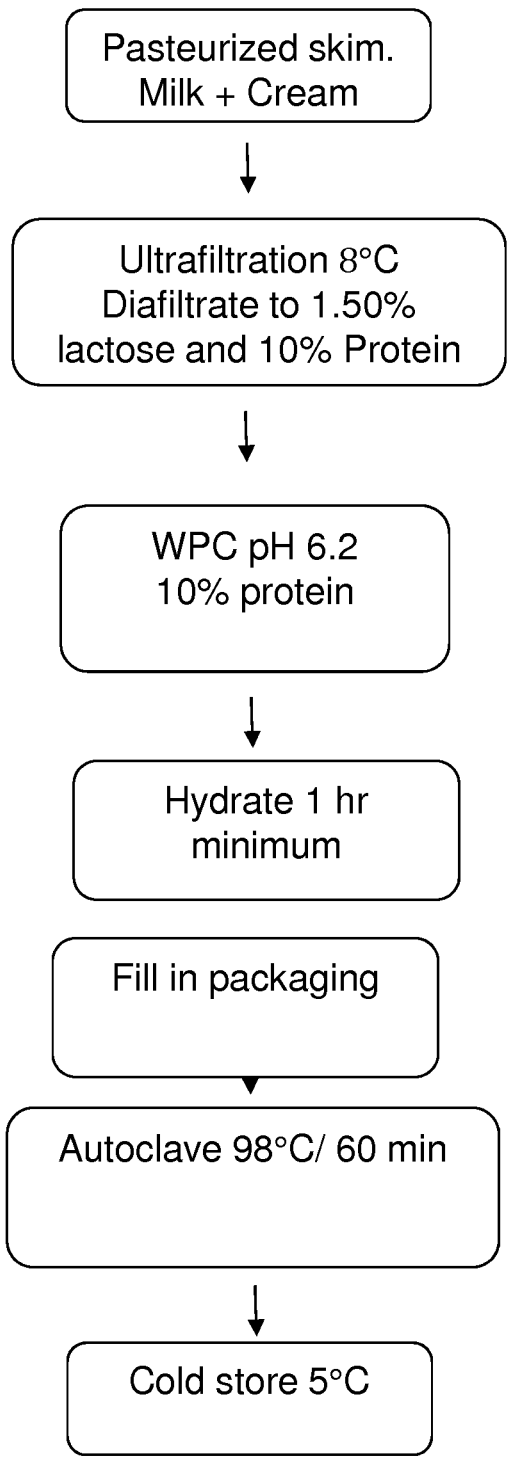
FIG. 5 shows a flow chart overview of a further method according to the invention. See also Example 5.

Process 2A (See also FIG. 5)

Skimmed milk was heated to 72° C. for 15 seconds, and cream was added to standardize the milk to 0.7 to 0.8% fat. This leads to a fat percentage in the final product in the range of from 2-3%. This was followed by ultrafiltration performed at 8° C., and diafiltration to a level of 1.50% lactose and 10% protein.

WPC was adjusted to pH 6.2 and 10% protein, and then added to the diafiltered mixture.

Hydration was allowed to take place for at least 1 hr, after which the mixture was filled in the packaging. The packaged mixture was autoclaved at 98° C. for 60 minutes, and then placed in cold storage (5° C.).

In a variation of Process 2A, the whey protein preparation used was QU7660. QU7660 was not pH adjusted, and only the protein level was adjusted to 10% protein.

Process 2B

Process 2B was performed in the same way as Process 2A up to and including hydration. After hydration the mixture is heated to 90° C. for 5 mins and a 0.7% solution of Glucono Delta Lactone is added. Thereafter the mixture is filled in the packaging and stored at 5° C. (not shown in FIG. 5).

Figure 6:
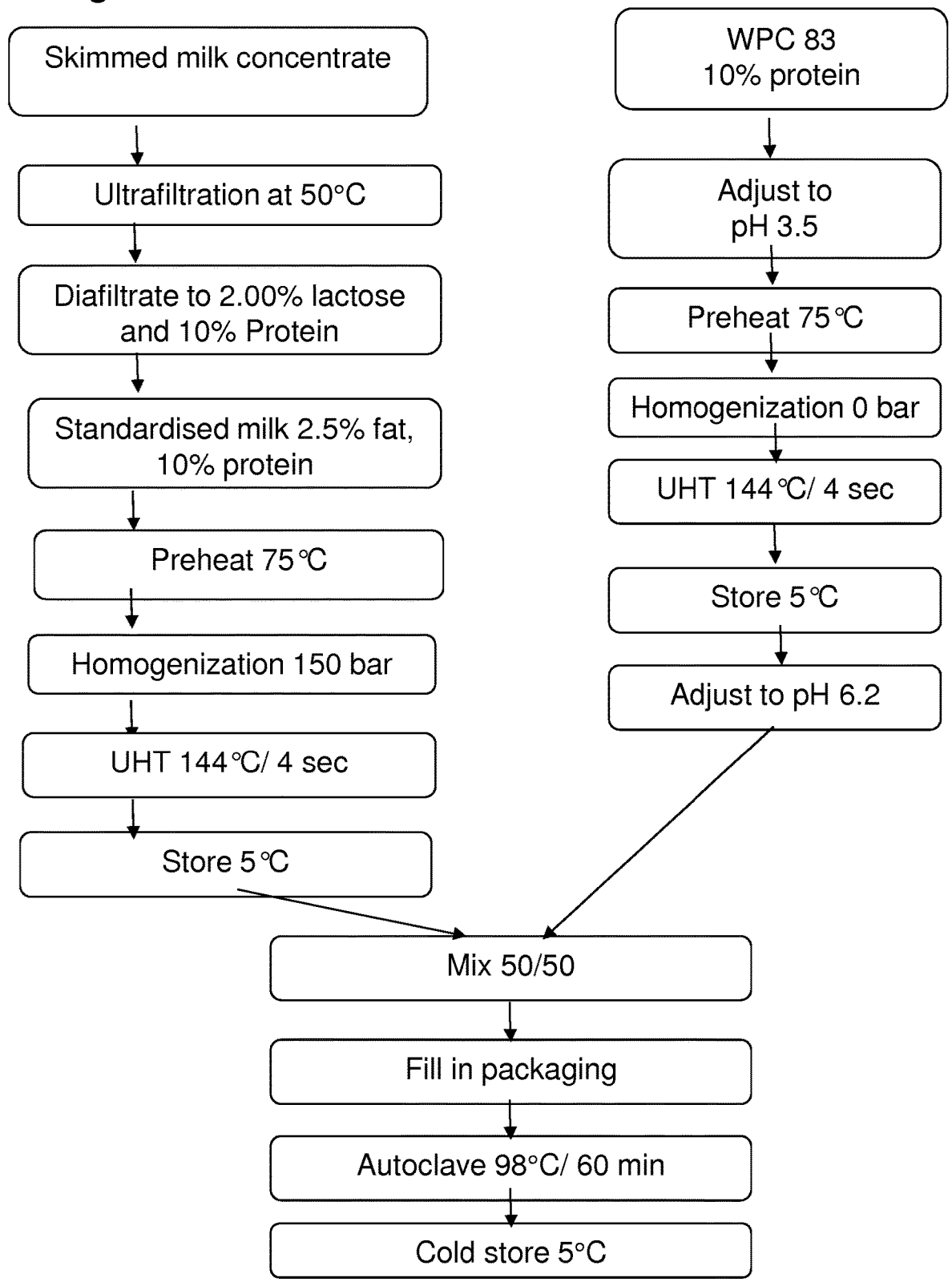
FIG. 6 shows a flow chart overview of a further method according to the invention. See also Example 5.
Figure 7:
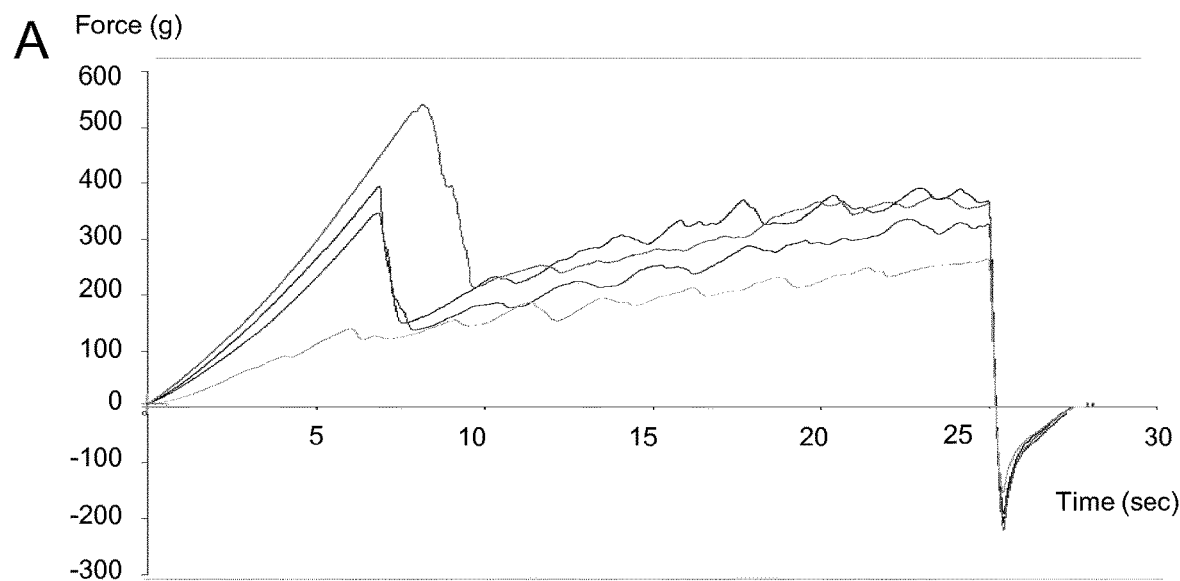
FIG. 7 shows an example of a curve from Texture analysis. See also Example 6.
Figure 7:
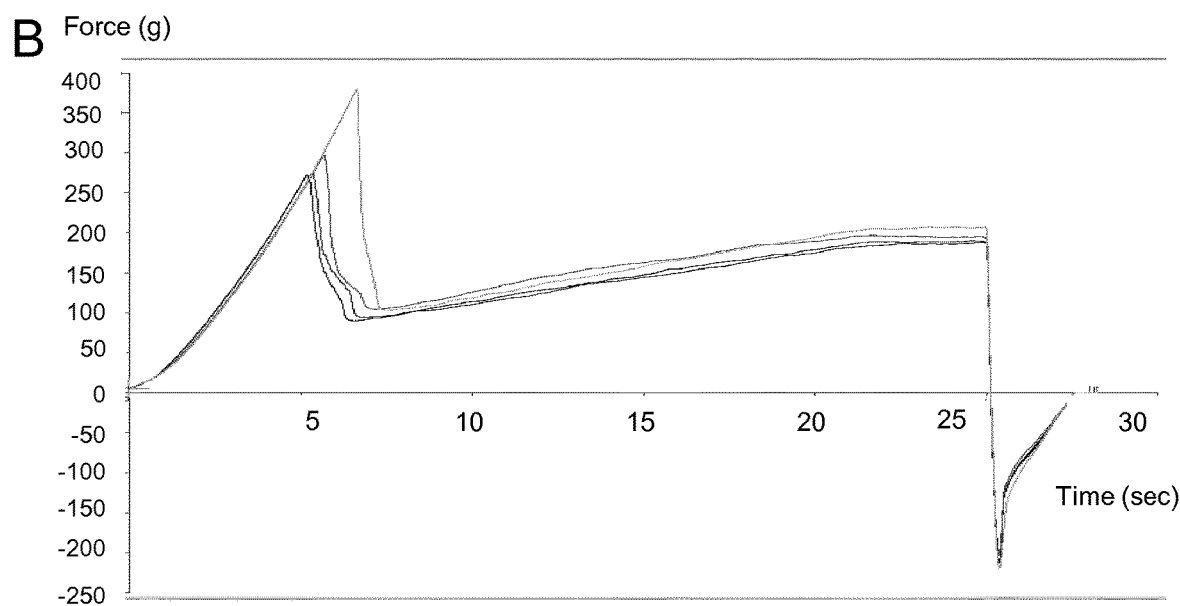
Figure 8:
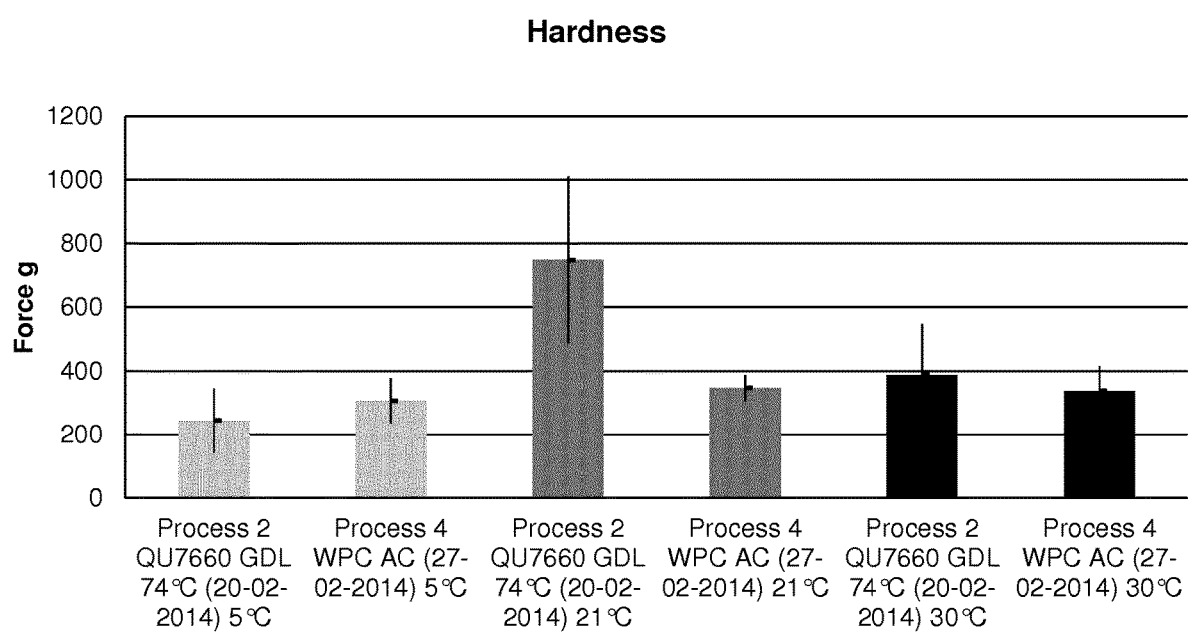
FIG. 8 shows the hardness of samples prepared according to Example 5 as measured in Texture analysis.
Figure 9:
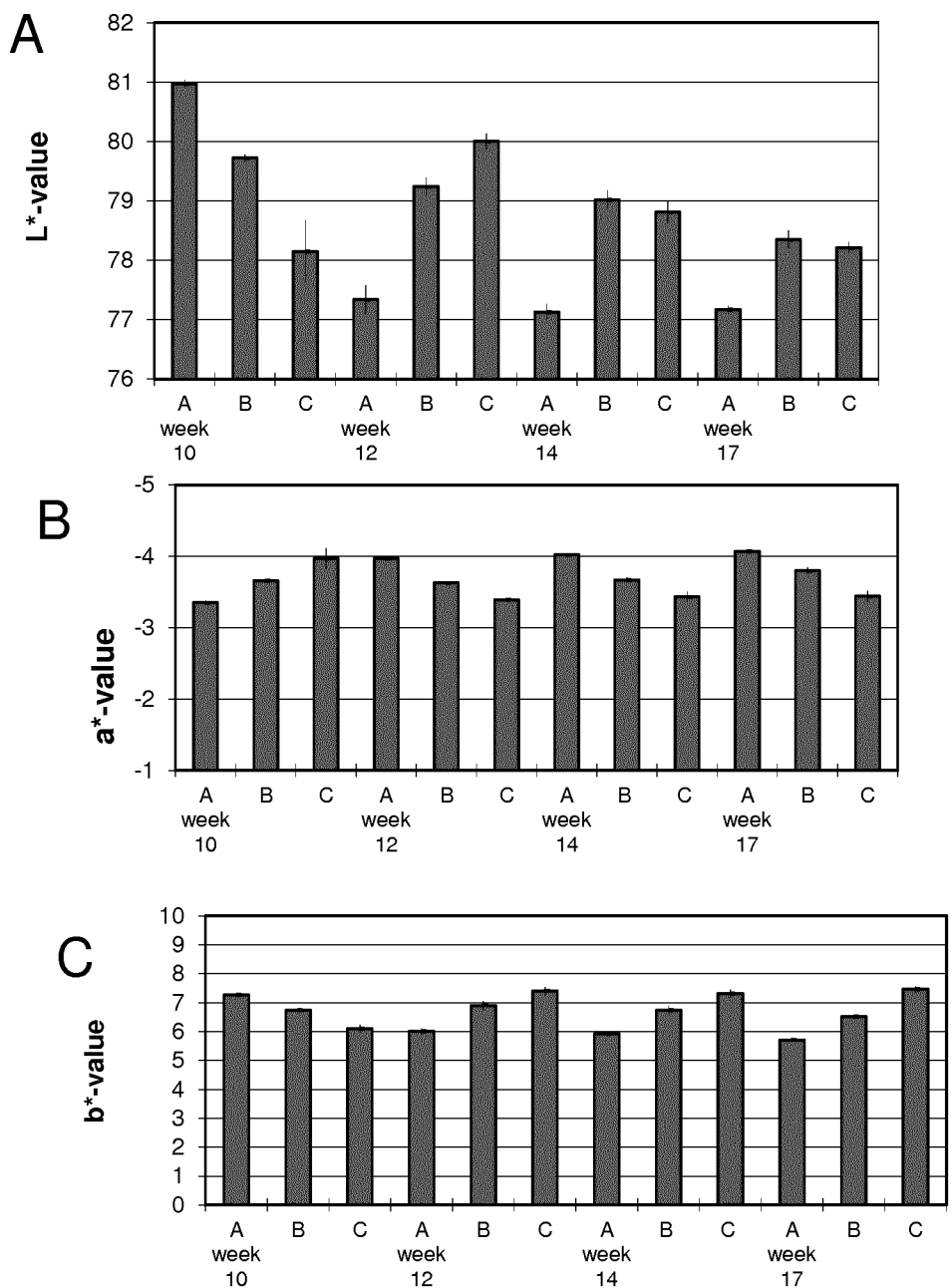
FIG. 9 shows the color measurements of samples from process 3A (see Example 5 and 7) over time. Figure legends: A=5° C.; B=21° C.; C=30° C.

Process 3A (See also FIG. 6)

Day 1: 1000 l of skimmed milk concentrate was ultrafiltrated at 50° C. and concentrated to 10% protein, and diafiltrated to 2% lactose. The ultrafiltrated mixture was standardized to 2.5% fat and pasteurized at 72° C. for 15 seconds, and placed in cold storage overnight.

Day 2

On Day 2, the mixture with standardised milk 2.5% fat and 10% protein is preheated to 75° C., homogenized at 150 bar, UHT-treated at 144° C. for 4 seconds and then cooled to 5° C.

WPC 83 solution with 10% and pH 3.5 is preheated to 75° C. and homogenised at 0 bar, UHT-treated at 144° C. for 4 seconds, cooled to 50° C. and finally pH adjusted to 6.2.

The two mixtures (the mixture with standardised milk fat and the mixture with the WPC 83 respectively) are mixed in a ratio 50/50, packaged and heated to 98° C. for 60 mins in the packaging, and then put in cold storage 5° C.

Process 3B

Process 3B was performed in the same way as Process 3A up to and including mixing in a ration 50/50. After this mixing step, the mixture is heated to 90° C. for 5 mins and a 0.7% solution of Glucono Delta Lactone (GLD) is added. Thereafter the mixture is filled in the packaging and stored at 5° C. (not shown in FIG. 5).

The samples prepared according to these different processes were stored at 5° C., 21° C. and 30° C. and analyses performed to study how storage affected the samples. The samples were evaluated for texture analysis, syneresis and colour changes.

One conclusion that can be drawn is that the texture of the samples correlate with the shelf-life of the sample. When the sample begins to deteriorate, the texture is also worsened.

All samples displayed acceptable texture when fresh. Regardless of the process, the samples that were stored at 30° C. deteriorated more rapidly than those stored at 5° C.

Samples made with GLD processes had overall a shorter shelf life than those prepared without GDL.

Example 7

Syneresis

Syneresis (the loss of water) was determined by weighing the sample before and after removal of water which had been expelled from the sliceable dairy product.

When water is lost, the texture of the product is changed. It becomes harder and more crumbly, which is not desired in this product. Therefore, conditions which minimize syneresis are preferred.

All samples displayed syneresis which increased over time and with increasing temperature. However, samples made with GDL-variation of the processes appeared to display more syneresis, and also to display syneresis earlier.

Thus, processes 1A, 2A and 3A appear to produce products which are comparable in quality in regards to syneresis.

Further, it appears that products produced from UHT treated milk are keeping (or holding) the water better.

Example 8

Colours of Samples

The colour of the samples was measured. The colour was measured in order to monitor whether Maillard browning would appear. Furthermore, microbial growth and/or spoiling of the product is associated with colour changes to less white and increased redness and/or greenness.

Samples were removed from storage at intervals, and analysed.

The samples were lighted with a standard source of light representing daylight and having a colour temperature of 6504 Kelvin. The reflected light is divided up into smaller wavelength intervals and is an expression of the spectral reflectance. This is transformed to colour coordinates:

L*, a* and b*.

The results of the colour measurements are given as L*-, a*- and b*-values.

The L*-values are measured in the interval from 0 to 100, where 0 is black and 100 is white.

The a*-values are measured in the interval from −60 to +60, where −60 is green and +60 is red.

The b*-values are measured in the interval from −60 to +60, where −60 is blue and +60 is yellow.

The samples are measured at 5° C., after calibration of the system.

The results are shown in Figures X-Y.

The value L* indicates whiteness of the product.

The data shows that the samples prepared by the different methods differ in the

The a*- and b*-values did not vary much over time for samples from any one method. Thus, samples made by any one method, displayed relatively stable a* and b*-values over time.

However, L-* values for samples from one method appear to vary somewhat over time. Se for example FIG. 11, showing the colour values for samples made by Process 3A.

Example 9

Microbiology

Samples from each of the processes described in Example 5 were stored at 5, 21 and 30° C. At different time points, samples were retrieved and microbiology analysed.

The results of the tests are shown in Table 5.

TABLE 5

| Microbiology, 5° C. after 1 week. | | | | | | |
|---|---|---|---|---|---|---|
| | Process 1A (QU7660) | Process 1A (WPC) | Process 2A (QU7660) | Process 2A (WPC) | Process 2B | Process 3 |
| Total count | 18 | <10 | <10 | <10 | <10 | <10 |
| Aerobic spores | <10 | <10 | <10 | <10 | <10 | <10 |
| Anaerobic spores | <10 | <10 | <10 | <10 | <10 | <10 |
| Yest | <10 | <10 | <10 | <10 | <10 | <10 |
| Mould | <10 | <10 | <10 | <10 | <10 | <10 |
| Coagulase positive staph | <10 | <10 | <10 | <10 | <10 | <10 |
| *Listeria* | no | no | no | no | no | no |
| *Bacillus cerus* | <10 | <10 | <10 | <10 | <10 | <10 |
| *Coli* | <10 | <10 | <10 | <10 | <10 | <10 |
| Anaerobic thermophilic spores | <100 | <100 | <100 | <100 | <100 | <100 |
| F count | <10 | <10 | 10 | <10 | <10 | |
| *Bacillus* spp. | <10 | <10 | <10 | <10 | 20 | <10 |
| Presump. Sulfitreduced clostridier | <10 | <10 | <10 | <10 | <10 | <10 |
| Sulfitreduced anaerobic | <10 | <10 | <10 | <10 | <10 | <10 |

As can be seen, at 5° C. and one week of storage, the levels of all tested microorganisms were acceptable.

TABLE 6

| Microbiology, 21 (one week at 21° C.) | | | | | | |
|---|---|---|---|---|---|---|
| | Process 1 (QU7660) | Process 1 (WPC) | Process 2 (QU7660) | Process 2 (WPC) | Process 2B (QU7660) | Process 3 |
| Total count | | | | | 90% of products show growth of microorganisms | |
| Aerobic spores | <3 | <3 | <3 | <3 | | <3 |
| Anaerobic spores | <3 | <3 | <3 | <3 | | <3 |
| Aerobic count 30° C. | <100 | <100 | <100 | <100 | | <1000 |

TABLE 7

| Microbiology, 30 | | | | | |
|---|---|---|---|---|---|
| Process 1 (QU7660) | Process 1 (WPC) | Process 2 (QU7660) | Process 2 (WPC) | Process 2B (QU7660) | Process 3 |
| Total count | | | | All products show growth of microorganisms | |

TABLE 7-continued

| | Microbiology, 30 | | | | | |
|---|---|---|---|---|---|---|
| | Process 1 (QU7660) | Process 1 (WPC) | Process 2 (QU7660) | Process 2 (WPC) | Process 2B (QU7660) | Process 3 |
| Aerobic spores | 240 | >11000 | >11000 | 2400 | | <3 |
| Anaerobic spores | <3 | 2400 | 7.4 | 210 | | <3 |
| Anaerobic thermophilic spores | <100 | <100 | <100 | <100 | | |
| Aerobic count 30° C. | | | | | | <1000 |

The microbiological data shows that the method using GDL is not suitable for storage other than possibly 5 degrees for shorter periods of time. The remaining processes yielded comparative results. For all the remaining samples the data show that storage at 5° C. gives virtually no microbiological growth, while storage at 30° C. allows growth of microbes.

Example 10

Sensory Panel

Samples from each process were also evaluated by sensory panel.

TABLE 8A

| | Sensory panel | | | |
|---|---|---|---|---|
| | Week 11 Week 11 | 5° C. | 21° C. | Cooked |
| Process 2B QU7660 | Smell Taste Appearance Texture Comment | sulphur Neutral Light yellow soft | Not evaluated because of syneresis | Not cooked |
| Process 3A | Smell Taste Appearance Texture Comment | sulphur Egg Yellowish Firm | | Not cooked |
| Process 1A QU7660 | Smell Taste Appearance Texture Comment | Egg Less eggwhite Yellowish very soft very a live | boiled, wool atypical, neutral creme white soft with bite | Not cooked |
| Process 1A | Smell Taste Appearance Texture Comment | Boiled milk boiled milk white flouer | Boiled milk egg, boiled milk white very soft | Not cooked |
| Process 2A QU7660 | Smell Taste Appearance Texture Comment | Boiled boiled milk less sulphur Creme white soft with bite | sulphur neutral, egg Yellowish soft | Not cooked |
| Process 2A WPC | Smell Taste Appearance Texture | Egg Egg, boiled, sulphur soft without bite creme white | boiled neutral soft without bite white | |

TABLE 8A-continued

| | Sensory panel | | | |
|---|---|---|---|---|
| | Week 11 Week 11 | 5° C. | 21° C. | Cooked |
| | Comment | | | Not cooked |

TABLE 8B

| | Sensory panel cont'd | | | |
|---|---|---|---|---|
| | Week 13 | 5° C. | 21° C. | Cooked |
| Process 2B QU7660 | Smell Taste Appearance Texture Comment | | | Not cooked |
| Process 3A WPC | Smell Taste Appearance Texture Comment | Neutral Neutral Yellowish firm | Neutral Neutral Yellowish firm | Neutral Neutral white, golden soft |
| Process 1A QU7660 | Smell Taste Appearance Texture Comment | Neutral milk, neutral Yellowish soft jelly | Neutral milk, neutral Yellowish soft jelly | Sulphur neutral golden very soft very a live |
| Process 1A WPC | Smell Taste Appearance Texture Comment | Neutral milk, neutral white very soft | Neutral milk, neutral white very soft | Neutral neutral white very soft |
| Process 2A QU7660 | Smell Taste Appearance Texture Comment | Neutral Neutral Yellowish firm | Neutral Neutral Yellowish firm | Neutral Neutral neutral soft create skin when cooked, water trapped inside |
| Process 2A WPC | Smell Taste Appearance Texture Comment | Neutral bitter glass soft discoloring | Neutral bitter glass soft discoloring | not cooked because of micobiology growth |

Example 11

Chemical Composition of Samples

The samples were analyzed for chemical composition and the results are shown in table 9.

TABLE 9

Chemical composition of samples

|  | Process 1 (QU7660) | Process 1 (WPC) | Process 2 (QU7660) | Process 2 (WPC) | Process 2B (QU7660) | Process 3 |
|---|---|---|---|---|---|---|
| Fat | 1.45 | 1.97 | 1.83 | 1.4 | 1.22 | 1.11 |
| Protein | 9.86 | 9.75 | 10.15 | 10.78 | 9.85 | 9.48 |
| DM | 15.7 | 15.77 | 16.56 | 15.74 | 13.86 | 15.35 |
| Calcium (mg) | 180 | 180 | 180 | 200 | 150 | 180 |
| Phosphor (mg) | 120 | 120 | 120 | 130 | 99 | 130 |
| Natrium | 0.091 | 0.065 | 0.09 | 0.064 | 0.078 | 0.21 |
| Ash | 0.89 | 0.86 | 0.86 | 0.88 | 0.75 | 1.21 |
| Lactose | 2.49 | 2.58 | 1.84 | 1.96 |  | 2.96 |

The invention claimed is:

1. A method of producing a sliceable dairy food product, said method comprising:
   a) preparing a liquid ingredient mix which comprises milk in the range of from 50 to 95% and supplemental whey protein in the range of from 4% to 20%, wherein the supplemental whey protein is acid whey;
   b) bringing the liquid ingredient mix to within a temperature of 30 to 70° C. while maintaining the liquid ingredient mix in an uncoagulated, liquid form;
   c) adjusting the pH to a value in the range of from 5.5 to 8.0;
   d) homogenizing the liquid ingredient mix while in the uncoagulated, liquid form;
   e) filling the homogenized liquid ingredient mix into a sealable packaging prior to a coagulation of the homogenized liquid ingredient mix;
   f) heating the liquid ingredient mix in the sealable packaging to a temperature in the range of from 90 to 155° C. so as to allow the coagulation of the liquid ingredient mix; and
   g) maintaining the temperature in the range of from 90 to 155° C. for a time period in the range of from 30 seconds to 9 hours, thereby forming a sliceable dairy food product.

2. The method according claim 1 wherein in step a) the liquid ingredient mix is prepared using milk in liquid form.

3. The method according to claim 1 wherein in step a) the liquid ingredient mix is prepared using milk in dry form, or milk powder.

4. The method according to claim 1, wherein in step a) the liquid ingredient mix is prepared using milk in liquid form and step a) comprises the sub-steps of:
   a.i) Providing milk in liquid form,
   a.ii.) Adding supplemental whey protein, wherein the supplemental whey protein is acid whey,
   a.iii.) heating the mixture of step a.ii) to a temperature of maximum 70° C.,
   a.iv.) homogenizing the mixture from step a.iii),
   a.v.) pasteurizing the mixture from step a.iv),
   a.vi.) optionally cooling the mixture from step a.v), and
   a.vii.) diafiltrating the mixture from step a.vi).

5. The method according to claim 4, wherein the homogenization in claim 4, step a.iv.) is performed at a pressure of at least 50 bar.

6. The method according to claim 4, wherein the pasteurization is performed at a temperature from 67 to 74° C. for a time period from 15 to 30 seconds.

7. The method according to claim 1, wherein the preparing of a liquid ingredient mix comprising milk and whey comprises:

a.i.) heating water to not more than 70° C.,
   a.ii.) adding fat to the water,
   a.iii.) adding milk in dry form and supplemental whey protein from acid whey to the mixture obtained in step a.ii) and mixing,
   a.iv.) homogenizing the mixture from a.iii), and
   a.v.) pasteurizing the mixture from a.iv).

8. The method according to claim 7, wherein the homogenization in claim 7, step a.iv.) is performed by rotator stator.

9. The method according to claim 7, wherein the pasteurization is performed by heating by direct steam to a temperature from 60° C. to 70° C. for 30 to 60 minutes.

10. The method according to claim 1, wherein the liquid ingredient mix prepared in step a) has a protein content of 10% to 12% weight/volume.

11. The method according to claim 1, wherein the ratio of the protein from milk to the supplemental whey protein in the liquid ingredient mix is in the range of from 40:60 to 60:40.

12. A sliceable dairy product obtainable by the method according to claim 1.

13. The sliceable dairy product according to claim 12, comprising milk and supplemental whey protein, an edible acid, and optionally sodium chloride and/or sodium hydroxide.

14. The product according to claim 12, wherein the sliceable dairy product has a modulus of G' of at least 2000.

15. The product according to claim 12, wherein the sliceable dairy product comprises at least 6% (weight/volume) protein.

16. The product according to claim 12, wherein the sliceable dairy product has a pH of at least 5.5.

17. The product according to claim 12, wherein the sliceable dairy product has a shelf life of at least 6 months.

18. The sliceable dairy product obtainable by the method according to claim 1 comprised in the sealable packaging.

19. The method according to claim 1, wherein the supplemental whey protein comprises a level of cGMP of no more than 5% w/w of dry weight of the supplemental whey protein.

20. The method according to claim 1, wherein salt is added to the liquid ingredient mix prior to the liquid ingredient mix being heated to the temperature in the range of from 90 to 155° C.

21. The method according to claim 1, wherein the liquid ingredient mix is maintained in an uncoagulated, liquid form at temperatures less than or equal to 69° C.

22. The method according to claim 1, wherein the sealable packaging is sealed prior to heating the liquid ingredient mix to the temperature in the range of from 90 to 155° C.

23. The method according to claim 1, wherein the sealable packaging is sterilizable.

24. The method according to claim 1, wherein the sealable packaging is configured so as to be re-sealable.

25. The method according to claim 21, wherein the temperature in the range of from 90 to 155° C. is maintained for a time period of 30 seconds to 2 hours.

26. The method according to claim 1, wherein lactose is removed from the liquid ingredient mix prior to the liquid ingredient mix being heated to the temperature in the range of from 90 to 155° C.

27. The method according to claim 4, wherein the supplemental whey protein provides 35 to 45% of the protein content in a diafiltration concentrate formed by diafiltration of the mixture in a.vii).

* * * * *